United States Patent
Kira et al.

(10) Patent No.: US 7,662,041 B2
(45) Date of Patent: Feb. 16, 2010

(54) GAME SYSTEM

(75) Inventors: Satoshi Kira, Kyoto (JP); Takamitsu Hagiwara, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 309 days.

(21) Appl. No.: 11/542,242

(22) Filed: Oct. 4, 2006

(65) Prior Publication Data

US 2007/0078008 A1    Apr. 5, 2007

(30) Foreign Application Priority Data

Oct. 4, 2005    (JP)    ............................. 2005-290670

(51) Int. Cl.
*A63F 13/12* (2006.01)
*G06F 3/00* (2006.01)

(52) U.S. Cl. ............................. 463/43; 463/44; 463/45

(58) Field of Classification Search ............... 463/1–69; D14/400; 345/532, 537, 536
See application file for complete search history.

(56) References Cited

U.S. PATENT DOCUMENTS

| | | | | | |
|---|---|---|---|---|---|
| 4,620,707 | A | * | 11/1986 | Lippincott | 463/44 |
| 5,552,799 | A | * | 9/1996 | Hashiguchi | 345/3.2 |
| 5,692,162 | A | * | 11/1997 | Okawa | 345/503 |
| 5,785,598 | A | * | 7/1998 | Hsu | 463/44 |
| 5,828,862 | A | * | 10/1998 | Singkornrat et al. | 711/115 |
| 5,941,775 | A | * | 8/1999 | Naka et al. | 463/44 |
| 6,238,291 | B1 | * | 5/2001 | Fujimoto et al. | 463/44 |
| 6,334,815 | B2 | * | 1/2002 | Miyamoto et al. | 463/43 |
| 6,338,680 | B1 | * | 1/2002 | Connors | 463/44 |
| 6,544,126 | B2 | * | 4/2003 | Sawano et al. | 463/42 |
| 6,955,606 | B2 | * | 10/2005 | Taho et al. | 463/43 |
| 2001/0010067 | A1 | * | 7/2001 | Nishiumi et al. | 711/112 |
| 2003/0008714 | A1 | * | 1/2003 | Tajiri et al. | 463/43 |

OTHER PUBLICATIONS

"Sega's Lock-on Technology" by Sega of America Inc, Computer Graphics World, Jan. 1995, vol. 18 Issue 1, pp. 20.*
"Pokemon Stadium Game Manual" by Nintendo, 1995-2000.*
Instruction manual of "Pokemon Dash", game software for Nintendo DS, pp. 18-19, released on Dec. 2, 2004, 3 pages.

* cited by examiner

*Primary Examiner*—Ronald Laneau
*Assistant Examiner*—Justin Myhr
(74) *Attorney, Agent, or Firm*—Nixon & Vanderhye P.C.

(57) ABSTRACT

A game system includes a game machine in which first and second cartridges can be simultaneously inserted. In a ROM of the first cartridge, a first game program is stored. When data is stored in a reserved area in a flash memory of the first cartridge, the first game program can be executed using the data. For example, when both of the cartridges are inserted simultaneously in the game machine, according to an instruction of a player, a writing program stored in the ROM of one of the cartridges is executed, and additional data stored in the ROM of the second cartridge, for example, image data used for generating a game screen is written into the flash memory of the first cartridge.

3 Claims, 20 Drawing Sheets

WRITING OF ADDITIONAL DATA (A)

(B)

GAME SYSTEM

CROSS REFERENCE OF RELATED APPLICATION

The disclosure of Japanese Patent Application No. 2005-290670 is incorporated herein by reference.

BACKGROUND OF THE INVENTION

Field of the Technology

The technology presented herein relates to a game system. More specifically, the technology relates to a game system including a game machine to which two storage media can be simultaneously inserted, and executing a game program stored in one of the storage media by using data stored in the other storage medium.

Literature 1 (Instruction manual of "Pokemon Dash", game software for Nintendo DS, pp. 18-19, released on Dec. 2, 2004) describes an example of a technique related to a game machine to which two storage media can be simultaneously inserted, and in which, at a time of execution of a game program stored in one of the storage media, data in the other storage medium is used. In the technique, in a case where two storage media are simultaneously inserted in the game machine, a new map not appearing when only one storage medium is inserted is displayed. Concretely, one of the storage media is a game cartridge for an upward compatible model (trade name: Nintendo DS) released later, and the other storage medium is a game cartridge for a lower-level model (trade name: game boy advance) released earlier. In a memory for saving in the game cartridge for the lower-level model, information on characters collected by playing the game is saved. On the other hand, in the game cartridge for the higher-level model, a plurality of pieces of special map data associated with a plurality of characters collected in the game of the game cartridge for the lower-level model are stored beforehand. At a time of executing a game in the game cartridge for the higher-level model in a case where both of the game cartridges are simultaneously inserted in the game machine (Nintendo DS) of the upper compatible model, use of special map data corresponding to the characters saved in the game cartridge for the lower-level model is authorized, and the game can be played with the special map. In such a manner, in a game of a game cartridge for a higher-level model, it is possible to enjoy a game extending differently from a usual one by using data saved in a game cartridge for the lower-level model.

However, in the above-described related art, a corresponding map stored beforehand in a game cartridge of a higher-level model can be just newly displayed when a specific game cartridge for a lower-level model corresponding to a game cartridge for a higher-level model is inserted and specific saved data is stored. Consequently, a newly displayed map is limited to a map stored beforehand in the game cartridge for the higher-level model. Since an extended part stored beforehand in a game cartridge for a higher-level model is just used in a game of the game cartridge for the higher-level model, after the game cartridge for the higher-level model is released, further extension is impossible.

Furthermore, at the stage of developing a game of a later game cartridge, it is necessary to fixedly determine an earlier game cartridge to which the later game cartridge is made correspond. Therefore, after a game cartridge for a higher-level model is released, it is impossible to make the game cartridge correspond to a new later game cartridge.

SUMMARY

Accordingly, a primary feature of an example embodiment presented herein is to provide a novel game system.

Another feature of the example embodiment is to provide a game system in which variations can be given to a game in a storage medium by adding data stored beforehand in another storage medium.

Further another feature of the example embodiment is to provide a game system in which variety can be given to a game in an earlier storage medium by using data of a later storage medium.

Further another feature of the example embodiment is to provide a game system in which variations can be given to a game in a storage medium for a lower-level model by using data stored beforehand in a storage medium for an upward compatible model.

A game system according to the example embodiment presented herein is a game system including a first storage medium, a second storage medium, and a game machine in which both of the first storage medium and the second storage medium can be simultaneously inserted. The first storage medium comprises a writable first storing means and a second storing means. The second storing means stores beforehand first image data and a first game program for executing a game process by using at least one of the first image data and data stored in the first storing means. The second storage medium comprises a third storing means for storing beforehand second image data, a second game program for executing a game process by using the second image data, additional data, and a writing program for writing the additional data into the first storing means in the first storage medium. The game machine comprises a first determining means, an executing means, and an adding means. The first determining means determines whether or not both of the first storage medium and the second storage medium are simultaneously inserted. The executing means executes the writing program stored in the third storing means in the second storage medium when the first determining means determines that both of the media are inserted simultaneously. The adding means reads the additional data from the third storing means in the second storage medium and writes the read data to the first storing means in the first storage medium by executing of the writing program by the executing means.

Concretely, the game system (10: reference numeral in the following embodiments. The same applied to following numerals.) includes the first storage medium (14), the second storage medium (16), and the game machine (12). In the game machine, both of the first storage medium and the second storage medium can be simultaneously inserted. The first storage medium includes the first storing means (14*b*, 112) and the second storing means (14*a*, 108, 110). The second storing means stores beforehand first image data and the first game program. The first storing means is writable and, for example, a flash memory can be applied. The first game program is prepared so that a game process can be performed by using at least one of the first image data and data stored in the first storing means. The second storage medium includes the third storing means (16*a*, 100, 102, 104, 106). The third storing means stores beforehand second image data, the second game program, additional data, and the writing program. The second game program is a program for executing a game process by using the second image data. The writing program is prepared so that the additional data stored in the third storing means can be written into the first storing means in the first storage medium. In the game machine, the first determining means (40, S3 to S7, S61) determines whether or not both of the first storage medium and the second storage medium are simultaneously inserted. The executing means (40, S45, S65) executes the writing program stored in the second storage medium when it is determined that both of the storage media are inserted simultaneously. The adding means (40, S67 to S69) reads the additional data from the second storage medium and writes the read data to the first storing means in the first storage medium by the execution of the writing program.

Thus, according to the example embodiment, the additional data and the writing program are prepared in the second storage medium. When both of the storage media are inserted simultaneously, the additional data is written in the first storing means in the first storage medium in accordance with the writing program. Consequently, at a time of executing the game in accordance with the first game program in the first storage medium, the additional data can be used. Therefore, the additional data stored beforehand in the second storage medium can be added to the first storage medium later, so that variety can be given to the game in the first storing means. For example, the additional data can be written to the first storage medium released earlier by the second storage medium released later, so that variety can be given to the earlier game.

A game system to the example embodiment is a game system including a first storage medium, a second storage medium, and a game machine in which both the first storage medium and the second storage medium can be simultaneously inserted. The first storage medium comprises a writable first storing means and a second storing means. The second storing means stores beforehand first image data, a first game program for executing a game process by using at least one of the first image data and data stored in the first storing means, and a writing program for writing additional data stored in a predetermined area in the second storage medium into the first storing means. The second storage medium comprises a third storing means for storing beforehand second image data, a second game program for executing a game process by using the second image data, and the additional data. The game machine comprises a first determining means, an executing means, and an adding means. The first determining means determines whether or not both of the first storage medium and the second storage medium are simultaneously inserted. The executing means executes the writing program stored in the second storing means in the first storage medium when the first determining means determines that both of the media are inserted simultaneously. The adding means reads the additional data from the third storing means in the second storage medium and writes the read data to the first storing means in the first storage medium by executing the writing program by the executing means.

Concretely, similarly to the above-described first invention, the game system (10) includes the first storage medium (14), the second storage medium (16), and the game machine (12). In the game machine, both the first storage medium and the second storage medium can be simultaneously inserted. In the second invention, different from the above-described first invention, the writing program is stored in the first storage medium. Specifically, the first storage medium includes the first storing means (14b, 112) and the second storing means (14a, 108, 110, 140). The second storing means stores beforehand first image data, a first game program, and the writing program. The writing program is prepared so that the additional data stored in the predetermined area in the second storage medium can be written into the first storing means. The second storage medium includes the third storing means (16a, 100, 102, 106). The third storing means stores beforehand second image data, a second game program, and additional data. In the game machine, the first determining means (40, S3-S7, S221) determines whether or not both of the first storage medium and the second storage medium are simultaneously inserted. The executing means (40, S207, S225) executes the writing program stored in the first storage medium when it is determined that both of the storage media are inserted simultaneously. The adding means (40, S227-S229) reads the additional data from the second storage medium and writes the read data to the first storing means in the first storage medium by the execution of the writing program.

Thus, in the example embodiment, the writing program is prepared in the first storage medium, and the additional data is prepared in the second storage medium. When both of the storage media are inserted simultaneously, the additional data is written in the first storing means in the first storage medium according to the writing program. Consequently, at a time of executing the game in accordance with the first game program in the first storage medium, the additional data can be used. Therefore, variation can be given to the game in the first storage medium, similarly to the above-described example embodiment. For example, data in the second storage medium released later can be written in the first storage medium released earlier, so that variety can be given to the earlier game.

In an embodiment, the first storage medium can be inserted to other game machine to which the second storage medium cannot be inserted.

Concretely, the first storage medium can be inserted to other game machine (18) different from the game machine. In the other game machine, the second storage medium cannot be inserted. That is, the first and second storage media are storage media used in different game systems or game apparatuses. Therefore, in the game system, by writing data between the storage media for different game systems, the different game systems can be associated with each other, so that a synergistic effect can be produced.

In another embodiment, the game machine is an upward compatible model of the other game machine. That is, the second storage medium is a storage medium for an upward compatible model, and the first storage medium is a storage medium for a lower-level model. The lower-level model may be a downward compatible model. Therefore, in the game system, data can be added from the storage medium for a higher-level model to the storage medium for a lower-level model, so that variety can be given to a game executed in the lower-level model by using the data in the storage medium for the higher-level model. The compatibility of the game machine in which both of the storage medium for a higher-level model and the storage medium for a lower-level model can be inserted can be effectively used.

A game system according to the example embodiment is a game system including a first storage medium for a first game machine, a second game machine having compatibility with the first game machine, and a second storage medium for the second game machine. The first storage medium has a writable area, and stores beforehand first image data, and a first game program for executing a game process by using at least one of data stored in the writable area and the first image data. The second storage medium stores beforehand additional data and a writing program for writing the additional data into the writable area in the first storage medium. The second game machine is a game machine into which both of the first storage medium and the second storage medium can be inserted, and writes the additional data stored in the second storage medium into the writable area in the first storage medium inserted by executing the writing program stored in the second storage medium inserted.

Concretely, the game system (10) includes the second game machine (12) having compatibility with the first game machine (18) and further includes the first storage medium (14) for the first game machine and the second storage medium (16) for the second game machine. The first storage medium for the first game machine has the writable area (14b, 112) and stores beforehand first image data and a first game program. The first game program is prepared so that a game process can be executed by using at least one of data stored in the writable area and the first image data. The second storage medium for the second game machine stores beforehand the writing program together with additional data. The writing program is prepared so that the additional data can be written into the writable area in the first storage medium. It should be noted that in the second storage medium, a game program may be further stored or may not be stored. The second game machine is provided in such a manner that both of the first storage medium and the second storage medium can be inserted. The second game machine may be provided so that both storage media can be inserted simultaneously or each of the storage media can be inserted separately. The second game machine writes the additional data stored in the second storage medium into the writable area in the first storage medium inserted by executing the writing program stored in the second storage medium inserted. It should be noted that in a case where both of the storage media cannot be inserted simultaneously, the writing program and the additional data is read from the second storage medium inserted first. After that, when the first storage medium is inserted, the additional data is written in the writable area. Thus, in the third invention, by utilizing an upward compatible machine, data can be added to the storage medium for a lower-level model. Therefore, variety can be given to the game for the lower-level model.

A game system according to the example embodiment is a game system including a first storage medium for a first game machine, a second game machine having compatibility with the first game machine, and a second storage medium for the second game machine. The first storage medium has a writable area, and stores beforehand first image data, a first game program for executing a game process by using at least one of data stored in the writable area and the first image data, and a writing program for writing additional data stored in a predetermined area in the second storage medium into the writable area. The second storage medium stores beforehand the additional data. The second game machine is a game machine into which both of the first storage medium and the second storage medium can be inserted, and writes the additional data stored in the second storage medium into the writable area in the first storage medium inserted by executing the writing program stored in the first storage medium inserted.

Concretely, similarly to the above-described example embodiment, the game system (10) includes the second game machine (12) having compatibility with the first game machine (18), and further includes the first storage medium (14) for the first game machine and a second storage medium (16) for the second game machine. In the fourth invention, different from the above-described third invention, the writing program is stored in the first storage medium. The writing program is prepared so that the additional data in the second storage medium can be written into the writable area (14b, 112) in the first storage medium. The first game program is prepared so that the game process can be executed using at least one of the data in the writable area and the first image data. It should be noted that in the second storage medium, in addition to the additional data, a game program may be further stored, or may not be stored. The second game machine is provided in such a manner that both of the first storage medium and the second storage medium can be inserted. The second game machine may be provided so that both of the storage media can be inserted simultaneously or inserted one by one. The second game machine writes the additional data stored in the inserted second storage medium into the writable area in the inserted first storage medium by executing the writing program stored in the inserted first storage medium. It should be noted that in a case where both of the storage media cannot be inserted simultaneously, the writing program is read from the first storage medium inserted first. After that, when the second storage medium is inserted, the additional data is read. After that, when the first storage medium is inserted, the additional data is written in the writable area. Thus, in the fourth invention, similarly to the above-described third invention, by utilizing an upward compatible machine, data can be added to the storage medium for a lower-level model. Therefore, variety can be given to the game for the lower-level model.

In an example embodiment, the second storage medium further stores beforehand a second game program that can be executed by the second game machine. Therefore, additional data stored in the second storage medium for executing a game for an upward compatible model can be written in the first storage medium for executing a game for a lower-level model.

A game system according to the example embodiment is a game system including a first game machine, a first storage medium for the first game machine, a second game machine, and a second storage medium for the second game machine. The first storage medium has a writable area, and stores beforehand first image data, and a first game program for executing a game process by using at least one of data stored in the writable area and the first image data. The second storage medium stores beforehand a second game program which can be executed by the second game machine, additional data, and a writing program for writing the additional data into the writable area in the first storage medium. At least one of the first game machine and the second game machine is a game machine into which both of the first storage medium and the second storage medium can be inserted, and writes the additional data stored in the second storage medium into the writable area in the first storage medium inserted by executing the writing program stored in the second storage medium inserted.

Concretely, the game system (10) includes the first game machine (18), the first storage medium (14) for the first game machine, the second game machine (12), and the second storage medium (16) for the second game machine. The first storage medium has a writable area (14b, 112). Further, the first storage medium stores beforehand first image data and a first game program. The first game program is prepared so that a game process can be executed by using at least one of data stored in the writable area and the first image data. The second storage medium stores beforehand a second game program, additional data, and a writing program. The second game program is a game program capable of being executed by the second game machine. The writing program is prepared so that the additional data can be written into the writable area in the first storage medium. At least one of the first game machine and the second game machine is provided in such a manner that both of the first storage medium and the second storage medium can be inserted. That is, at least one of the first and second game machines may be provided so that both of the storage media can be inserted simultaneously or one by one. By executing the writing program in the inserted second storage medium in at least one of the first and second game machines, the additional data stored in the second storage medium is written into the writable area in the inserted first storage medium. It should be noted that in a case where both of the storage media cannot be inserted simultaneously, at least one of the first and second game machines reads the writing program and the additional data from the second storage medium inserted first, and writes the additional data into the first storage medium inserted later.

Therefore, in the example embodiment, data can be added between different game systems of the game system including the first game machine and the first storage medium and the game system including the second game machine and the second storage medium. Thus, a synergistic effect can be obtained.

A game system according to the example embodiment is a game system including a first game machine, a first storage medium for the first game machine, a second game machine, and a second storage medium for the second game machine. The first storage medium has a writable area, and stores beforehand first image data, a first game program for executing a game process by using at least one of data stored in the writable area and the first image data, and a writing program for writing additional data stored in a predetermined area in the storage medium into the writable area. The second storage medium stores beforehand a second game program which can be executed by the second game machine, and the additional data. At least one of the first game machine and the second game machine is a game machine into which both of the first storage medium and the second storage medium can be inserted, and writes the additional data stored in the second storage medium into the writable area in the first storage medium inserted by executing the writing program stored in the first storage medium inserted.

Concretely, the game system (10) includes, similarly to the above-described fifth invention, the first game machine (18), the first storage medium (14) for the first game machine, the second game machine (12), and the second storage medium (16) for the second game machine. In the sixth invention, different from the above-described fifth invention, in the first storage medium for the first game machine, the writing program is stored beforehand. The writing program is prepared so that the additional data stored beforehand in the second storage medium can be written in the writable area (14b, 112) in the first storage medium. Also, the first game program is prepared so that a game process can be executed by using at least one of data stored in the writable area and the first image data. It should be noted that in the second storage medium, in addition to the additional data, a second game program capable of being executed by the second game machine is also stored. At least one of the first game machine and the second game machine is provided in such a manner that both of the first storage medium and the second storage medium can be inserted simultaneously or one by one. In at least one of the first and second game machines, the additional data stored in the second storage medium is written into the writable area in the inserted first storage medium by executing the writing program stored in the inserted first storage medium. It should be noted that if both of the storage media cannot be inserted simultaneously, at least one of the first and second game machines reads the writing program from the first storage medium inserted first. After that, when the second storage medium is inserted, additional data is read. Further, when the first storage medium is inserted after that, the additional data is written into the writable area. Thus, data can be added between different game systems of the game system including the first game machine and the first storage medium and the game system including the second game machine and the second storage medium. Therefore, a synergistic effect can be obtained.

In another embodiment the first game program executes the game process by using one of the first image data and the additional data written in the first storage medium, selected by the player. Therefore, options for the player can be increased and the player can play the game with his/her favorite data.

In another embodiment the additional data is image data having the same format as that of the first image data. Therefore, at a time of executing the first game program, in place of the first image data, the added image data can be used as it is to generate the game screen. Thus, variety can be given to the game image.

According to the example embodiment, the additional data stored beforehand in the second storage medium is written into the first storing means in the first storage medium in accordance with a writing program stored beforehand in either the first or second storage medium. Therefore, at a time of executing the game in accordance with the first game program in the first storage medium, the additional data can be used. Thus, since the data stored beforehand in one storage medium can be added to the other storage medium later, variety can be given to the game in the other storage medium.

Furthermore, even in a case where the first storage medium has been released first, the additional data in the second storage medium can be written into the first storage medium later by executing the writing program. Therefore, by using data stored beforehand in a later storage medium, variety can be given to a game in an earlier storage medium.

Also, in a case where the first storage medium is a storage medium for a lower-level model, additional data prepared in the second storage medium for an upward compatible model can be written into the first storage medium later by executing the writing program. Therefore, variety can be give to a game in the storage medium for the lower-level model by using data stored beforehand in the storage medium for an upward compatible model.

The above described features, aspects and advantages of the example embodiment presented herein will become more apparent from the following detailed description of the example embodiment when taken in conjunction with the accompanying drawings.

BRIEF DESCRIPTION OF THE DRAWINGS

FIG. 10(A) shows a case where an initial pattern is selected, and FIG. 10(B) shows a case where an additional pattern is selected;

DETAILED DESCRIPTION OF THE PREFERRED EMBODIMENTS

Figure 1:
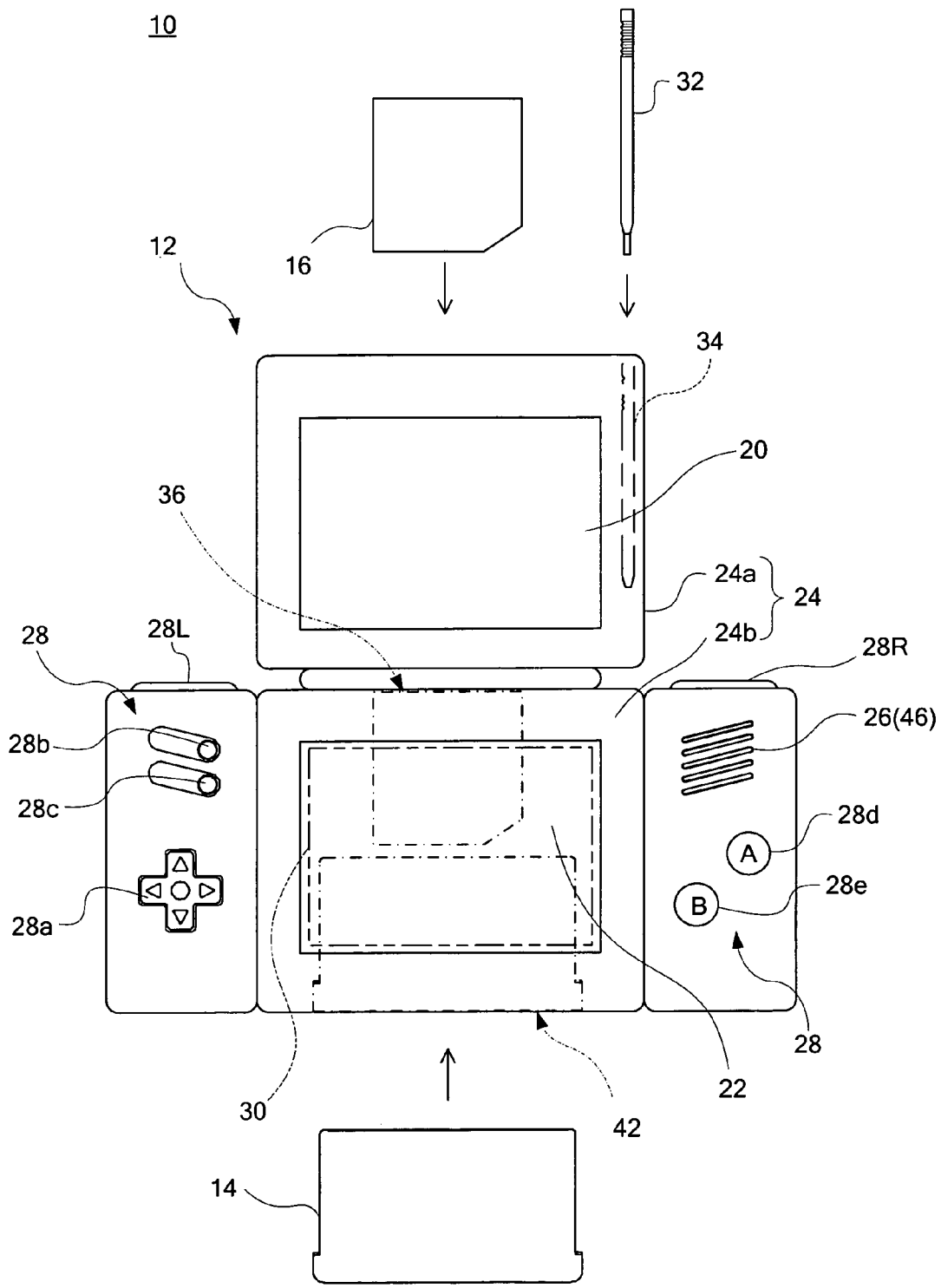
FIG. 1 is an outside drawing showing an example of a game system of an embodiment.
Figure 2:
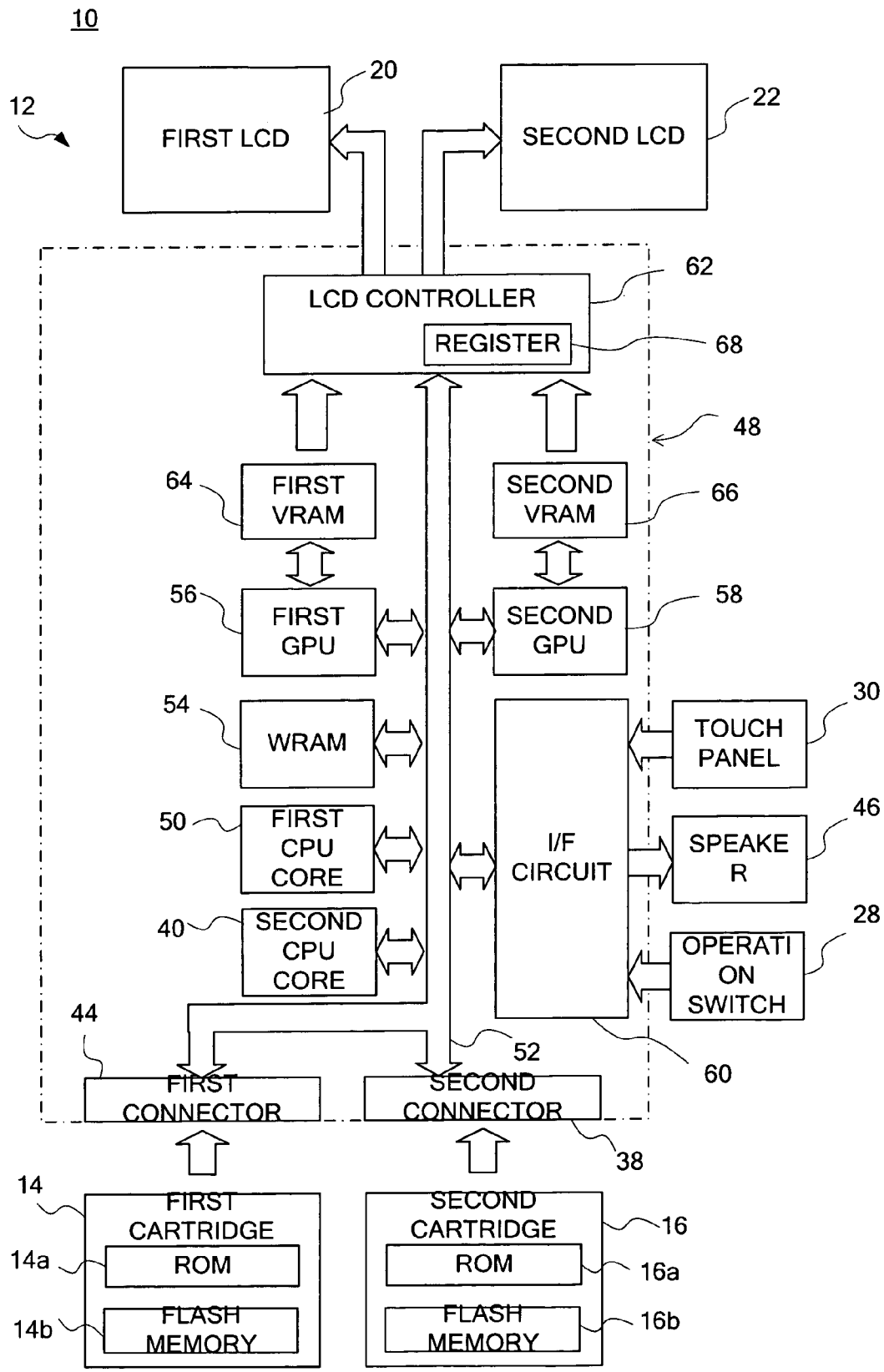
FIG. 2 is a block diagram showing an example of an electric configuration of the embodiment of FIG. 1.
Figure 3:
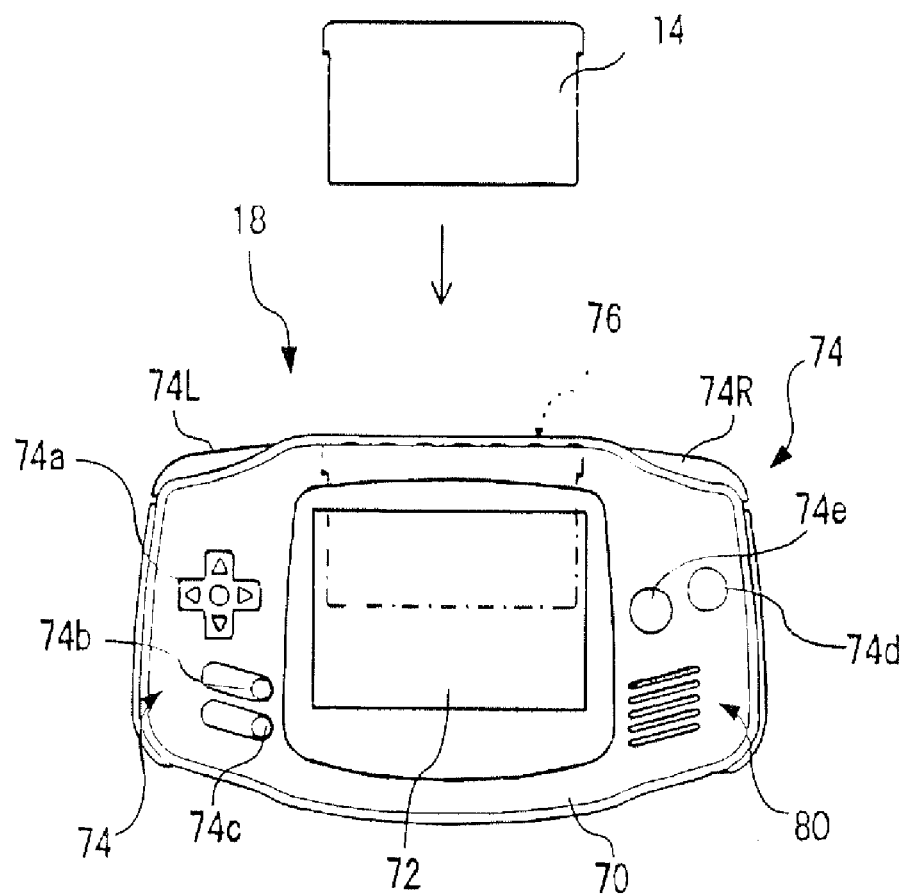
FIG. 3 is an illustrative view showing an example of a game machine to which only a first cartridge of the embodiment of FIG. 1 can be inserted.
Figure 4:
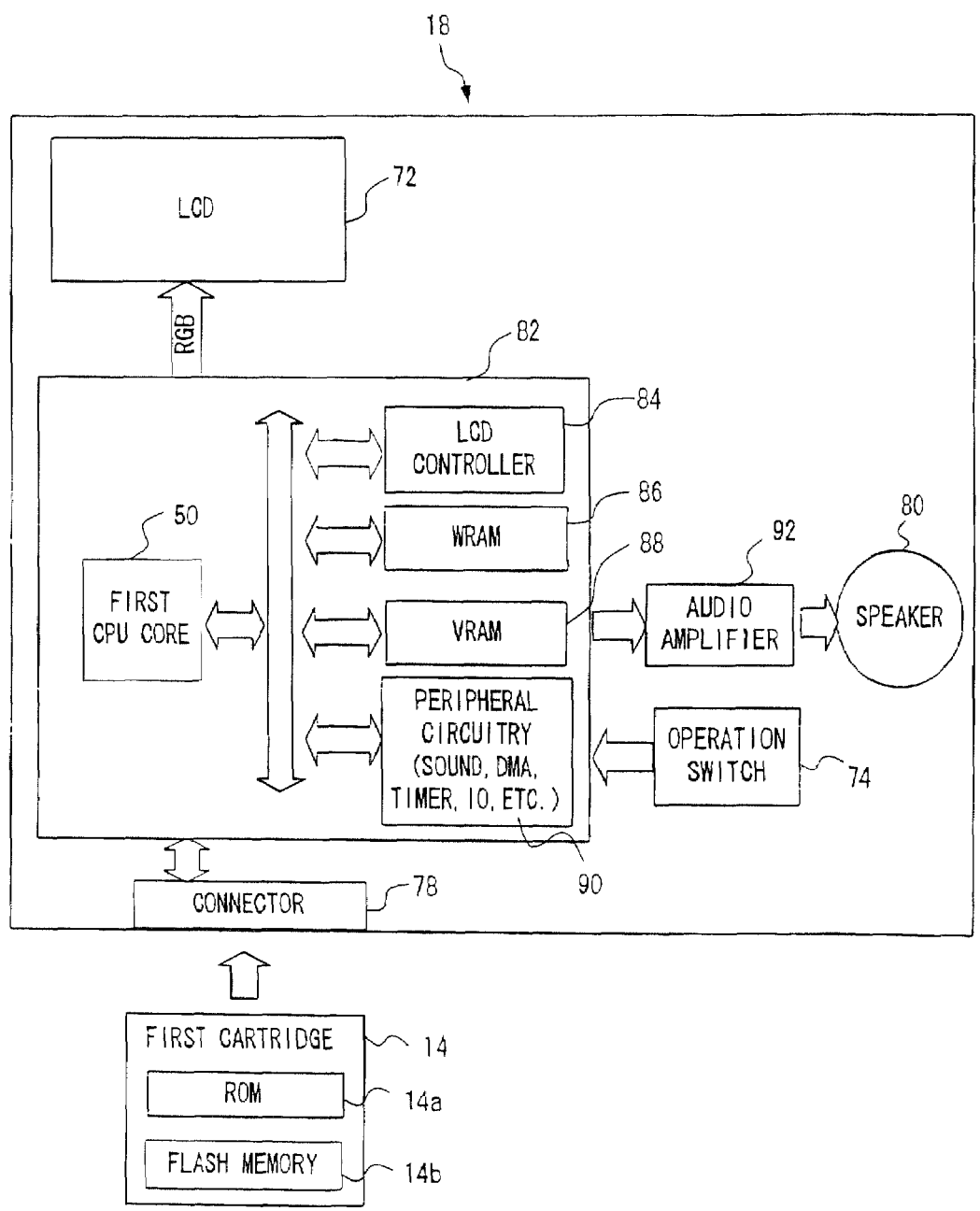
FIG. 4 is a block diagram showing an example of the electric configuration of the game machine of FIG. 3.

A game system 10 of an embodiment shown in FIG. 1 and FIG. 2 includes a game machine 12 and a first game cartridge 14 and a second game cartridge 16 that are attachable/detachable to/from the game machine 12. Hereinafter, the game cartridge will be also simply called "cartridge". The first cartridge 14 is also attachable/detachable to/from another game machine 18 as shown in FIG. 3 and FIG. 4. However, the second cartridge 16 cannot be inserted in the game machine 18. The game machine 18 is also called a first game machine, and the game machine 12 is also called a second game machine.

It should be noted that as an example, the game machine 12 may be a handheld game machine (trade name: "Nintendo DS") manufactured and sold by Nintendo Co., Ltd., and the second cartridge 16 may be a memory card of the game machine, "a card dedicated to Nintendo DS". Also, the game machine 18 may be another handheld game machine (trade name: "Game Boy Advance") manufactured and sold by Nintendo Co., Ltd., and the first cartridge 14 may be a cartridge of the game machine, "a cartridge dedicated to Game Boy Advance". The "Nintendo DS" is released after "Game Boy Advance" and an upward compatible model of "Game Boy Advance". The "Nintendo DS" basically executes a game program of a "card dedicated to Nintendo DS", and can also execute a game program of a "cartridge dedicated to Game Boy Advance".

Referring to FIG. 1, the game machine 12 includes a first liquid crystal display (LCD) 20 and a second LCD 22. The LCD 20 and the LCD 22 are provided on a housing 24 so as to be arranged in a predetermined position in the housing. In this embodiment, the housing 24 comprises an upper housing 24a and a lower housing 24b, and the LCD 20 is provided on the upper housing 24a while the LCD 22 is provided on the lower housing 24b. Accordingly, the LCD 20 and the LCD 22 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 24a has a plane shape little larger than a plane shape of the LCD 20, and has an opening formed so as to expose a display surface of the LCD 20 from one main surface thereof. On the other hand, the lower housing 24b has a plane shape horizontally longer than the upper housing 24a, and has an opening formed so as to expose a display surface of the LCD 22 at an approximately center of the horizontal direction. Furthermore, the lower housing 24b is provided with a sound emission hole 26 and an operation switch 28 (28a, 28b, 28c, 28d, 28e, 28L and 28R).

In addition, the upper housing 24a and the lower housing 24b are rotatably connected at a lower side (lower edge) of the upper housing 24a and a part of an upper side (upper edge) of the lower housing 24b. Accordingly, in a case of not playing a game, for example, if the upper housing 24a is rotatably folded such that the display surface of the LCD 20 and the display surface of the LCD 22 are face to face with each other, it is possible to prevent the display surface of the LCD 20 and the display surface of the LCD 22 from being damaged such as a flaw, etc. It should be noted that the upper housing 24a and the lower housing 24b are not necessarily rotatably connected with each other, and may alternatively be provided integrally (fixedly) to form the housing 24.

The operation switch or operation key 28 includes a direction instructing switch (cross switch) 28a, a start switch 28b, a select switch 28c, an action switch (A button) 28d, an action switch (B button) 28e, an action switch (L button) 28L, and an action switch (R button) 28R. The switches 28a, 28b and 28c are placed at the left of the LCD 22 on the one main surface of the lower housing 24b. Also, the switches 28d and 28e are placed at the right of the LCD 22 on the one main surface of the lower housing 24b. Furthermore, the switches 28L and 28R are placed in a part of an upper edge (top surface) of the lower housing 24b at a place except for a connected portion with the upper housing 24a, and lie of each side of the connected portion.

The direction instructing switch 28a functions as a digital joystick, and is utilized for instructing a moving direction of an operational object. More specifically, by operating any one of four depression portions, a player character (or player object) to be operated by a player (user) or a cursor, or the like can be moved to a direction corresponding to the operated portion.

The start switch 28b is formed by a push button, and is utilized for starting (restarting), temporarily stopping a game, and so forth. The select switch 28c is formed by the push button, and utilized for a game mode selection, etc.

The action switch (action key) 28d, that is, the A button is formed by the push button, and utilized for an instruction of an action except for an instruction of a moving direction. This button allows the player character to perform an arbitrary movement (action), such as hitting (punching), throwing, holding (obtaining), riding, jumping, cutting, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. Additionally, in menu selection, the player can use this button to confirm a menu item at which the cursor is placed, that is, a selected menu item and execute an action or process corresponding to the item.

The action switch 28e, that is, the B button is formed by the push button, and is utilized for changing a game mode selected by the select switch 28c, canceling an action determined by the A button 28d, and so forth.

The action switch (L button) 28L and the action switch 28R (R button) are formed by the push button, and the L button 28L and the R button 28R can perform the same operation as the action switch 28d, 28e or perform different operations. These buttons also can function as a subsidiary of the action switch 28d, 28e. Each of the above mentioned push buttons may be configured as a switch that is activated by depressing its key top. This allows the player to specify an action through an easy operation of depressing any of the switches.

Also, on a top surface of the LCD 22, a touch panel 30 is provided. As the touch panel 30, any one of kinds of a resistance film system, an optical system (infrared rays system) and an electrostatic capacitive coupling system, for example, can be utilized. In response to an operation by depressing, stroking, touching, hitting, and so forth with a stick 32, a pen (stylus pen), or a finger (hereinafter, referred to as "stick or the like 32") on a top surface of the touch panel 30, the touch panel 30 detects coordinates of a position indicated by the stick or the like 32 (that is, touched) to output coordinates data indicative of the detected coordinates.

It should be noted that in this embodiment, a resolution of the display surface of the LCD 22 is 256 dots×192 dots, and a detection accuracy of the touch panel 30 (operation surface) is also rendered 256 dots×192 dots in correspondence to the display surface (this is true for the LCD 20). However, in FIG. 1, in order to simply represent the touch panel 30, the touch panel 30 is displayed different from the LCD 22 in size, but the display screen of the LCD 22 and the operation surface of the touch panel 30 are the same in size. It should be noted that the detection accuracy of the touch panel 30 may be lower than the resolution of the display surface, or higher than it.

Different game screens may be displayed on the LCD 20 and the LCD 22. Furthermore, by utilizing the two display areas (LCD 20 and LCD 22) as one screen, it is possible to display a large monster (enemy character) to be defeated by the player character, for example. Accordingly, the player is able to point an object image such as a player character, an enemy character, an item object, texture information, an icon, etc. to be displayed on the LCD 22, or select commands, or input coordinates by operating the touch panel 30 with the use of the stick or the like 32.

Thus, the game machine 12 has the LCD 20 and the LCD 22 as a display portion of two screens, and by providing the touch panel 30 on an upper surface of any one of them (LCD 22 in this embodiment), the game machine 12 has the two screens (20, 22) and the operation portions (28, 30) of two systems.

In addition, in this embodiment, the stick 32 can be inserted into a housing portion (slot or concavity) 34 provided in proximity to a side surface (right side surface) of the upper housing 24a, for example, and taken out therefrom as necessary. It should be noted that in a case of preparing no stick 32, it is not necessary to provide the housing portion 34.

The second cartridge 16 is inserted into a loading slot 36 provided on a rear surface or an upper edge (top surface) of the lower housing 24b. Although omitted in FIG. 1, a second connector 38 (see FIG. 2) is provided at a depth portion of the loading slot 36 for connecting a connector (not shown) provided at an end portion of the second cartridge 16 in the loading direction, and when the second cartridge 16 is loaded into the loading slot 36, the connectors are connected with each other, and therefore, the second cartridge 16 is accessible by a second CPU core 40 (see FIG. 2) of the game machine 12.

Also, the first cartridge 14 is inserted into a loading slot 42 provided on a bottom surface (lower edge) of the lower housing 24b. Although omitted in FIG. 1, a first connector 44 (see FIG. 2) is provided at a depth portion of the loading slot 42 for connecting a connector (not shown) provided at an end portion of the first cartridge 14 in the loading direction, and when the first cartridge 14 is loaded into the loading slot 42, the connectors are connected with each other, and therefore, the first cartridge 14 is accessible by the second CPU core 40 of the game machine 12.

It should be noted that although not illustrated in FIG. 1, a speaker 46 (see FIG. 2) is provided at a position corresponding to the sound emission hole 26 inside the lower housing 24b.

Furthermore, although omitted in FIG. 1, for example, a battery accommodating box is provided on a rear surface of the lower housing 24b, and a power switch, a volume switch, an external expansion connector, an earphone jack, etc. are provided on a bottom surface of the lower housing 24b.

FIG. 2 is a block diagram showing an electrical configuration of the game system 10. Referring to FIG. 2, the game machine 12 includes an electronic circuit board 48, and on the electronic circuit board 48, a circuit component such as the CPU core 40, etc. is mounted. The game machine 12 includes two CPU, that is, the second CPU core 40 and a first CPU core 50. The first CPU core 50 can also serve as a processor of the game machine 18 of the lower-level model, as shown in FIG. 4. In a case that only the first cartridge 14 is inserted into the game machine 12, the first CPU core 50 or the second CPU core 40 operates to perform a game of the first cartridge 14. Also, in a case that only the second cartridge 16 is inserted into the game machine 12, or in a case that both the first cartridge 14 and the second cartridge 16 are simultaneously inserted, the second CPU core 40 operates as a main CPU and the first CPU core 50 operates as a sub CPU.

The second CPU core 40 is connected to the above-mentioned first CPU core 50, first connector 44 and second connector 38 via a bus 52, and is connected with a WRAM (working RAM) 54, a first graphics processing unit (GPU) 56, a second GPU 58, and an input-output interface circuit (hereinafter, referred to as "I/F circuit") 60, and an LCD controller 62.

The first connector 44 is detachably connected with the first cartridge 14 for the lower-level model as described above. The first cartridge 14 includes a ROM 14a such as a mask ROM and a flash memory 14b, and although illustration is omitted, the ROM 14a and the flash memory 14b are connected with each other via a bus and also connected with a connector (not shown) to be connected with the first connector 44. Accordingly, the second CPU core 40 and the first CPU core 50 gain access to the ROM 14a and the flash memory 14b.

The second connector 38 is detachably connected with the second cartridge 16 for the upward compatible model as described above. The second cartridge 16 includes a ROM 16a such as a mask ROM and a flash memory 16b, and although illustration is omitted, the ROM 16a and the flash memory 16b are connected with each other via a bus and also connected with a connector (not shown) to be connected with the second connector 38. Accordingly, the second CPU core 40 gains access to the ROM 16a and the flash memory 16b.

The ROM 14a of the first cartridge 14 stores beforehand a first game program for a game (virtual game) to be executed by the game machine 12 or the game machine 18, first image data (character image, object image, background image, item image, icon (button) image, message image, cursor image, image data for various screens), first sound data for outputting sound (music, BGM, sound effect, etc.) necessary for the game, etc.

The ROM 16a of the second cartridge 16 stores beforehand a second game program for a game to be executed by the game machine 12, second image data, and second sound data, etc.

It should be noted that the flash memory 14b and 16b are erasable and writable memories, that is, rewritable and nonvolatile memories, and are provided as memories for saving data such as proceeding data and result data of the game. Further, instead of the flash memories 14b and 16b, an SRAM that is powered by a backup battery or other nonvolatile memories such as an EEPROM, an FeRAM may be employed.

In addition, if an application except for a game is executed, the ROM 14a and the ROM 16a store a program for the application and image data necessary for execution of the application, etc. Also, sound (music) data is stored as necessary.

The WRAM 54 is utilized as a buffer memory or a working memory. For example, when executing the game of the second cartridge 16, the second CPU core 40 loads the game program, the image data, the sound data, etc. stored in the ROM 16a of the second cartridge 16 into the WRAM 54, and executes a game process according to the loaded game program. The second CPU core 40 executes the process while storing data (game data, flag data, etc.) generated or obtained in correspondence with a progress of the game, etc. in the WRAM 54. Also, when executing the game of the first cartridge 14, the first CPU core 50 loads the game program, the image data, the sound data, etc. stored in the ROM 14a of the first cartridge 14 into the WRAM 54, and executes a game process according to the loaded game program. The first CPU core 50 executes the process while storing data generated or obtained in correspondence with a progress of the game, etc. in the WRAM 54.

It should be noted that the program, the image data, the sound data, etc. are loaded from the ROM 14a or the ROM 16a entirely at a time, or partially and sequentially as necessary so as to be stored into the WRAM 54. However, like this embodiment, if a storage medium that is directly accessible by the CPU core is employed, unlike in a case that a DVD-ROM, a CD-ROM, or the like is employed as a storage medium, there is no need to transfer the program and the data to the WRAM so as to be held. In addition, if the flash memory 14b and the flash memory 16b store data, the data is loaded into the WRAM 54 as necessary.

Each of the GPU 56 and the GPU 58 forms a part of a rendering means, is constructed by a single chip ASIC, for example, and receives a graphics command (construction command) from the second CPU core 40 to generate game image data according to the graphics command. It should be noted that the second CPU core 40 applies an image generation program (included in the game program) to both of the GPU 56 and GPU 58.

Furthermore, the GPU 56 is connected with a first video RAM (hereinafter, referred to as "VRAM") 64, and the GPU 58 is connected with a second VRAM 66. The GPU 56 and the GPU 58 respectively access the first VRAM 64 and the second VRAM 66 to obtain data necessary for executing the graphics command (image data: character data, texture data, etc.). It should be noted that the second CPU core 40 reads image data necessary for rendering from the WRAM 54, the ROM 16a or the ROM 14a, and writes it to the first VRAM 64 and the second VRAM 66 via the GPU 56 and the GPU 58. The GPU 56 accesses the VRAM 64 to generate game image data for display, and stores the image data in a rendering buffer in the VRAM 64. The GPU 58 accesses the VRAM 66 to create game image data for rendering, and stores the image data in a rendering buffer of the VRAM 66. A flame buffer or a line buffer may be employed as a rendering buffer.

The VRAM 64 and the VRAM 66 are connected to the LCD controller 62. The LCD controller 62 includes a register 68, and the register 68 consists of one bit, for example, and stores a value of "0" or "1" (data value) according to an instruction of the second CPU core 40. The LCD controller 62 outputs the game image data created by the GPU 56 to the LCD 20, and outputs the game image data created by the GPU 58 to the LCD 22 in a case that the data value of the register 68 is "0". On the other hand, the LCD controller 62 outputs the game image data created by the GPU 56 to the LCD 22, and outputs the game image data created by the GPU 58 to the LCD 20 in a case that the data value of the register 68 is "1".

In addition, if the game of the first cartridge 14 is executed, for example, the first CPU core 50 reads the image data necessary for rendering from the WRAM 54 or the ROM 14a, and writes it in the first VRAM64 via the GPU 56. Then, the first CPU core 50 accesses the VRAM 64 via the GPU 56 to generate the game image data for display, and stores the image data in the rendering buffer of the VRAM 64. The rendered image data is outputted to the LCD 20 or the LCD 22 by the LCD controller 62. When the game of the first cartridge 14 is executed, only one screen is displayed, and therefore, the setting whether the screen is displayed on the LCD 20 or the LCD 22 is performed in advance in the game machine 12.

It should be noted that the LCD controller 62 can directly read the image data from the VRAM 64 and the VRAM 66, or read the image data from the VRAM 64 and the VRAM 66 via the GPU 56 and the GPU 58.

Also, the VRAM 64 and the VRAM 66 may be provided in the WRAM 54, or the rendering buffer and a Z buffer may be provided in the WRAM 54.

The I/F circuit 60 is connected with the operation switch 28, the touch panel 30 and the speaker 46. Here, the operation switch 28 is the above-described switches 28a, 28b, 28c, 28d, 28e, 28L and 28R, and in response to an operation of the operation switch 28, a corresponding operation signal (operation data) is inputted to the first CPU core 50 or the second CPU core 40 via the I/F circuit 60. Furthermore, operation data outputted from the touch panel 30 (coordinates data) is inputted to the first CPU core 50 or the second CPU core 40 via the I/F circuit 60. Accordingly, the first CPU core 50 or the second CPU core 40 executes the process according to the instruction given though the operation switch 28 and/or the touch panel 30 by the player. In addition, the first CPU core 50 or the second CPU core 40 reads from the WRAM 54, the ROM 14a, or the ROM 16a the sound data necessary for the game such as a game music (BGM), a sound effect or voices of a game character (onomatopoeic sound) or the like, and outputs the sound from the speaker 46 via the I/F circuit 60.

Referring to FIG. 3, the game apparatus of the lower-level model includes the game machine 18 and the first cartridge 14. The game machine 18 includes a horizontally oriented housing 70, for example. Formed on an approximately center of a front surface of the housing 70 is a color LCD 72. The LCD 72 displays a game image including a virtual game space and a game character existing in the game space, etc. and displays a menu screen and message and so forth as necessary. Also, an operation switch or operation key 74 (74a, 74b, 74c, 74d, 74e, 74L and 74R) is provided on the housing 70. The operation switches 74a, 74b and 74c are arranged on a left side of the LCD 72, and the operation switches 74d and 74e are arranged on a right side of the LCD 72. Further, the operation switches 74L and 74R are arranged at both ends on an upper edge surface (top surface) of the housing 70 (in an upper side of the LCD 72).

The operation switch 74a is a cross button that functions as a digital joy stick. By operating any one of four depression portions, a moving direction of a game character, a cursor or the like displayed on the LCD 72 can be instructed, for example. The operation switch 74b is a start button formed by the push button, and is utilized to instruct a game start, etc. The operating switch 74c is a select button formed by the push button, and is utilized to select a game mode, etc.

The operation switch 74d is an A button formed by the push button, and allows the game character displayed on the LCD 72 to perform an arbitrary action, such as hitting, throwing, holding, riding, jumping, for example. The operation switch 74e is a B button formed by the push button, and is utilized for changing the game mode selected by the select button 74c, cancelling the action determined by the A button 74d, and so forth. The operation switch 74L is a left push button (L button) formed by the push button, and the operation switch 74R is a right push button (R button) formed by the push button. The operation switch 74L and the operation switch 74R can perform the same operation as the A button 74d and the B button 74e. These buttons also can function as a subsidiary of the A button 74d and the B button 74e.

In addition, a loading slot 76 is formed at an upper end on a rear surface of the housing 70. The above-described first cartridge 14 is loaded into the loading slot 76. Although omitted in FIG. 3, a connector 78 (see FIG. 4) is provided at a depth portion of the loading slot 76 for connecting a connector (not shown) provided at an end portion of the first cartridge 14 in the loading direction. When the first cartridge 14 is loaded into the loading slot 76, the connectors are connected with each other. Therefore, the first cartridge 14 is accessible by a first CPU core 50 (see FIG. 4) of the game machine 18.

Additionally, a speaker 80 is contained on the lower side of the A button 74d and the B button 74e inside the housing 70 for outputting sound such as BGM, sound effects, or voices or onomatopoeic sound of the game character, or the like during the game.

In addition, although omitted in FIG. 3, an external expansion connector is further provided on a top surface of the housing 70, and a battery accommodating box is provided on a rear surface of the housing 70, and a power switch, a volume switch, an earphone jack, etc. are provided on a bottom surface of the housing 70.

FIG. 4 is a block diagram showing an electrical configuration of the game machine 18. Referring to FIG. 4, the game machine 18 includes a processor 82. The processor 82 includes the first CPU core 50, an LCD controller 84, a WRAM (working RAM) 86, a VRAM 88 and peripheral circuitry 90. Additionally, the peripheral circuitry 90 includes an audio (sound) circuit, a DMA (Direct Memory Access) circuit, a timer circuit, an input/output interface (IO), etc.

As described above, the processor 82 applies a display signal, that is, an RGB signal in this embodiment to the LCD 72 provided on the front surface of the game machine 18, and thus the LCD 72 displays a game image in color. Also, the processor 82 outputs an audio signal to the sound circuit, and an audio amplifier 92 amplifies the audio signal, and then the speaker 80 outputs such sounds as game music and sound effects, or voices or the like. In addition, an operating signal from the operation switch 74 is inputted into the processor 82.

Accordingly, the processor 82 performs a process under an instruction provided by the player through the operation switch 74.

In addition, the game machine 18 has a cartridge connector 78 which is connected with the first cartridge 14. The first cartridge 14 contains the ROM 14a and the flash memory 14b, as described above.

When the game machine 18 is powered on, the first CPU core 50 starts execution of a boot program stored in a built-in ROM (boot ROM) not shown to perform a process of activation of the game machine 18. After that, the first CPU core 50 executes a game program stored in the ROM 14a of the first cartridge 14, and carries out a game process while storing temporary data generated or obtained in the WRAM 86. Additionally, image data generated by execution of the game program by the first CPU core 50 is stored in the VRAM 88, and the image data stored in the VRAM 88 is outputted by the LCD controller 84 to the LCD 72.

As was shown earlier in the game system 10 of FIG. 1, data to be added to the game in the first cartridge 14 is stored in the second cartridge 16. When both of the first and second cartridges 14 and 16 are simultaneously inserted in the game machine 12, the additional data is written in the flash memory 14b in the first cartridge 14.

Figure 5:
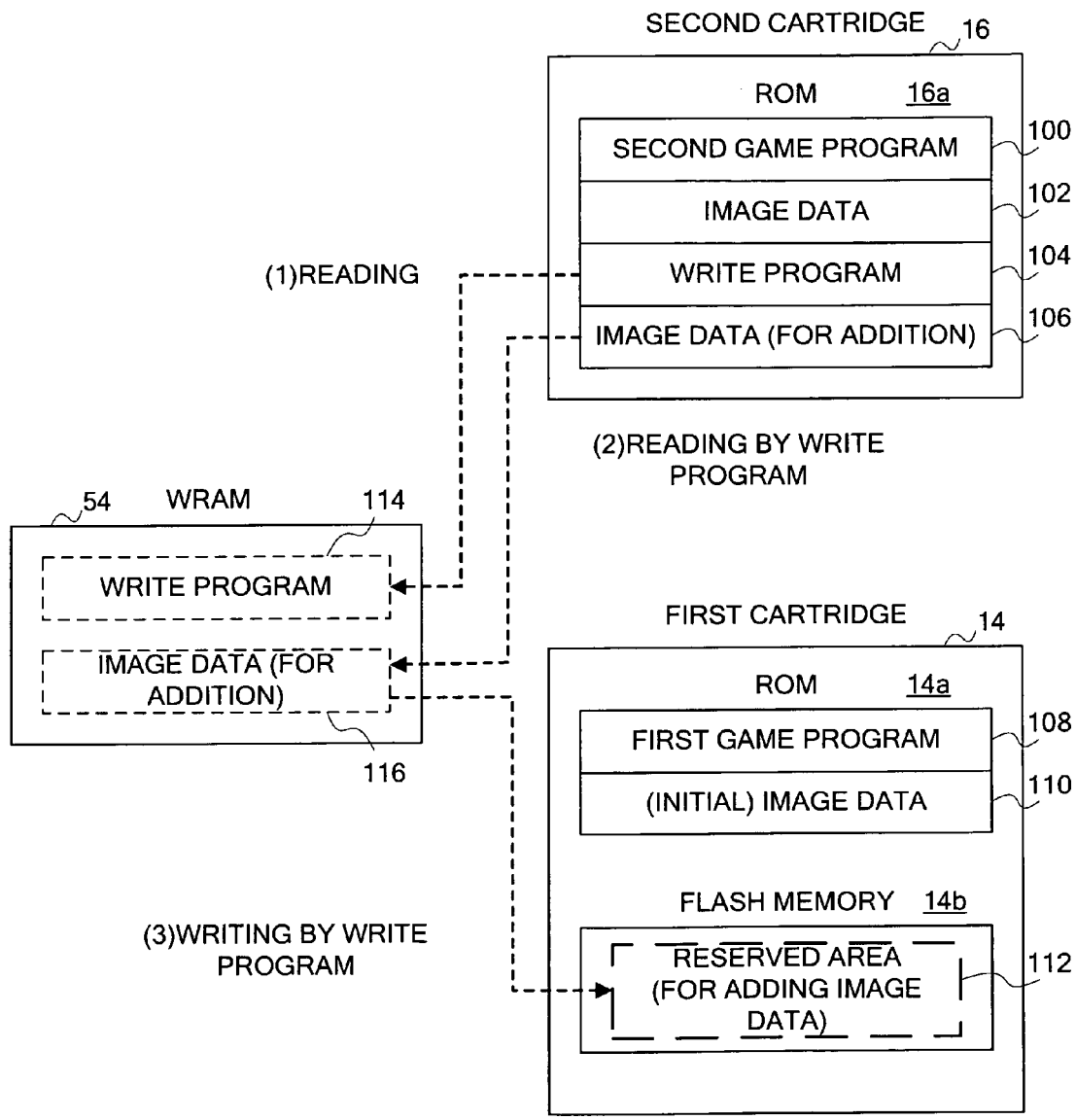
FIG. 5 is an illustrative view showing an example of a procedure of writing image data of a second cartridge in a case where a writing program is stored in the first cartridge.

In the embodiment, as shown in FIG. 5, a writing program for writing the additional data to the first cartridge 14 is stored in the second cartridge 16. Concretely, the ROM 16a in the second cartridge 16 includes a second game program memory area 100, an image data memory area 102, a writing program memory area 104, and an additional image data memory area 106. In the image data memory area 102, second image data used in execution a second game program is stored. On the other hand, the ROM 14a in the first cartridge 14 includes a first game program memory area 108 and an image data memory area 110. In the image data memory area 110, first image data used in execution of the first game program is stored. The first image data is also called initial image data in contrast to the additional image data. The flash memory 14b in the first cartridge 14 includes a reserved area 112 for storing the additional data. The writing program is prepared (created) so as to read the additional data stored in the predetermined area 106 in the ROM 16a in the second cartridge 16 into a predetermined area 116 in the work area of the WRAM 54, and write the additional data to the reserved area 112 in the flash memory 14b in the first cartridge 14. The first game program is prepared so that, when the additional data is stored in the reserved area 112 in the flash memory 14b, the data in the reserved area 112 can be read and used.

A procedure of writing the additional data to the first cartridge 14 will be described. First, the second CPU core 40 reads the writing program stored in the predetermined area 104 in the ROM 16a in the second cartridge 16 into a predetermined area 114 in the WRAM 54. The reading operation can be performed when it is determined that a predetermined condition is satisfied. The predetermined condition may be that, for example, writing is instructed by operation of a player on a screen for selecting writing. In such a manner, the data in the flash memory 14b of the first cartridge 14 can be prevented from being rewritten without any confirmation or acceptance of the player. The screen may be an option screen for various settings or a screen displayed when a predetermined condition is satisfied, for example, when a predetermined item is obtained or a predetermined event is cleared during the game. Subsequently, by executing the read writing program, the second CPU core 40 reads the additional data stored in the predetermined area 106 in the ROM 16a of the second cartridge 16 into the predetermined area 116 in the WRAM 54. Then, by the execution of the writing program, the second CPU core 40 writes the additional data to the predetermined area 112 in the flash memory 14b in the first cartridge 14. It should be noted that since the erasing/writing operation can be performed on the block unit basis on the flash memory, the data of the block including the reserved area 112 is rewritten.

In the following, an example of the case of adding image data of a game object stored in the second cartridge 16 to the first cartridge 14 storing the first game program for executing a game in which a game object is displayed will be described.

In addition, by the first game program, for example, a game of making a row in a plurality of pieces arranged in a matrix in a game space have the same color is executed. The color of the front face of each of the pieces and that of the rear face are different from each other, and the pieces showing their front faces and the pieces showing their rear faces are arranged mixedly in a matrix. A piece selected by the player is turned over. When the colors in a row becomes the same, that is, all of the pieces show either front or rear by the operation, all of the pieces in the row are erased. A condition of completing the game is, for example, to erase all of the pieces by selecting a plurality of desired pieces with one stroke and making the colors in each of all of the rows same.

Figure 6:
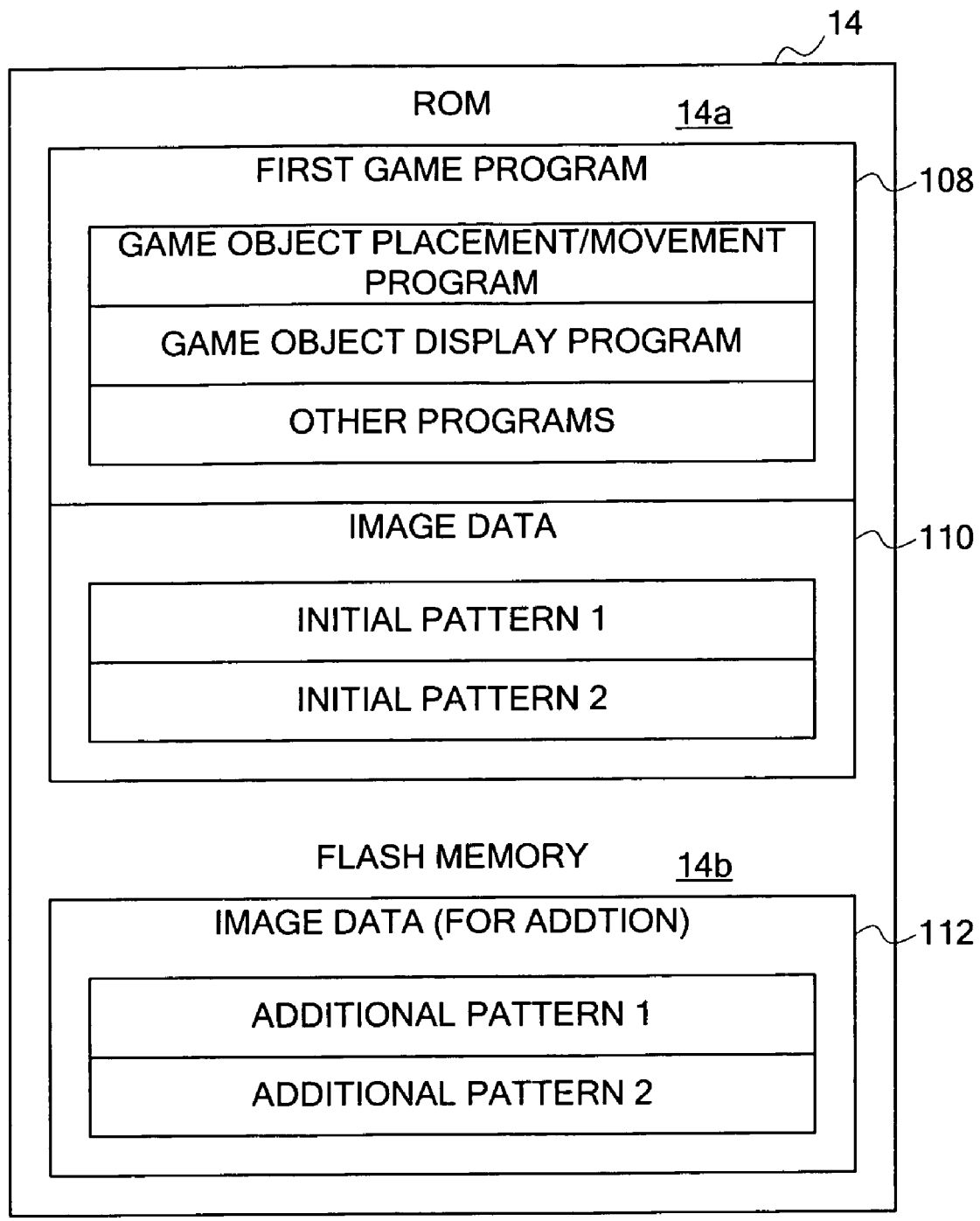
FIG. 6 is an illustrative view showing an example of a memory map of a ROM and a flash memory in the first cartridge.

FIG. 6 shows an example of the memory map of the ROM 14a and the flash memory 14b of the first cartridge 14. For simplicity, FIG. 6 shows part of the memory map.

In the first game program memory area 108, a game object placement/movement program, a game object display program, and other programs are stored. The game object placement/movement program is a program for controlling placement (position) and movement of a game object in a game space. The game object display program is a program for generating and displaying a game image indicative of the game space including the game object based on position data, image data, and the like of the game object. The other programs are programs for executing various processes for proceeding of the game such as a program for outputting sound such as a music and sound effect.

In the image data memory area 110, image data of a game object and, in addition, image data of various screens, cursors, and the like is stored. For example, the game object is a block or piece placed in the game space. A plurality of pieces (for example, seven pieces) of image data for displaying the piece are stored as initial patterns 1, 2, . . . . The pieces are displayed by using pattern data in different patters or color patterns. The pattern data used for displaying the pieces is designated by its identification information (such as pattern number). In a case where a game object is created by a three-dimensional model, the image data may be texture data for mapping onto a polygon.

The memory area 112 in the flash memory 14b is a reserved area for storing additional image data. A plurality of areas (for example, four areas) may be reserved to add a plurality of pieces of image data. Therefore, in the reserved area 112, a plurality of pieces of additional image data for displaying the pieces can be stored as the additional patterns 1, 2, . . . . For example, by the pattern data added to the area 112, the patterns of the pieces can be increased from the initial state.

Figure 7:
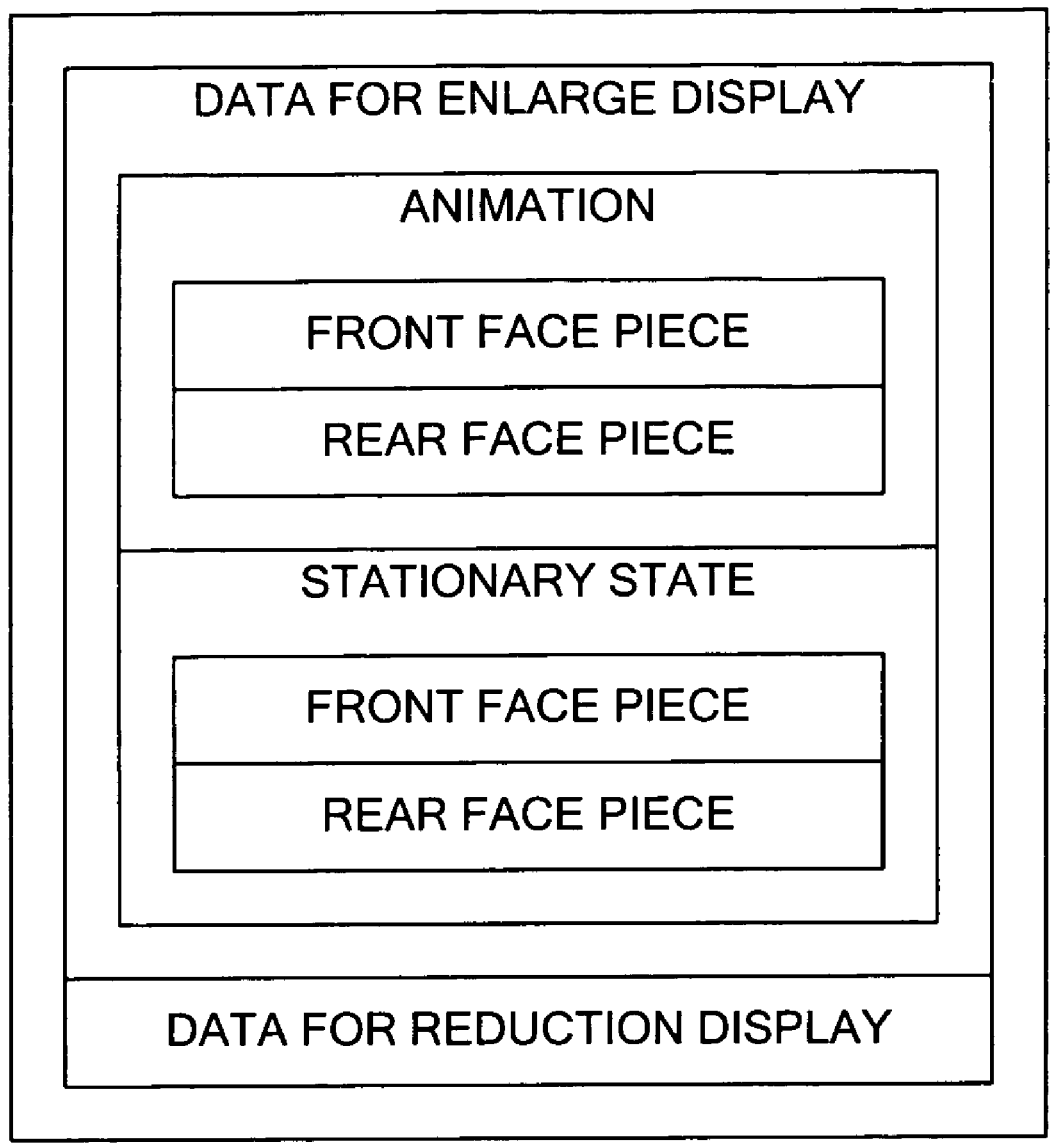
FIG. 7 is an illustrative view showing a detailed example of pattern data.

FIG. 7 shows an example of a concrete content of image data (pattern data) of pieces. In the embodiment, initial image data stored in the memory area 110 and additional image data stored in the memory area 112 are prepared in the same format. Therefore, a game image or game screen can be easily generated by using the additional image data as it is in place of the initial image data. It should be noted that in another embodiment, initial image data and additional image data may be prepared in different formats. In this case, a process for enabling the additional image data to be used in place of the initial image data has to be performed on the additional image data by the writing program.

Figure 8:
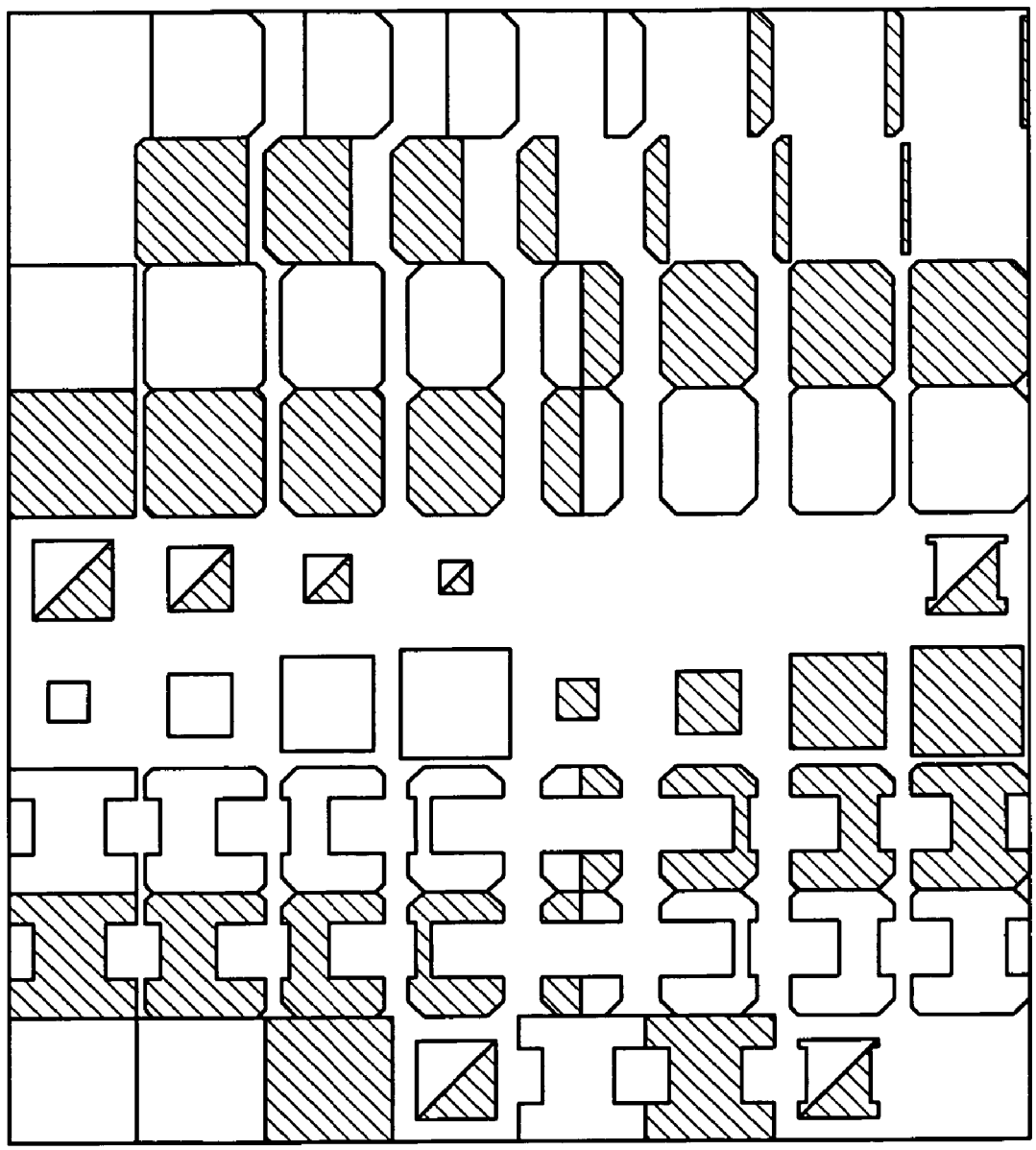
FIG. 8 is an illustrative view showing an image of data for enlarge display in the pattern data.

The pattern data may include a plurality of pieces of data according to the sizes of the pieces. In FIG. 7, the pattern data includes data for enlarge display (one piece has a size of, for example, 16×16 dots) and data for reduction display (for example, 8×8 dots). The image data of a piece of each size includes animation data for displaying a predetermined movement of the piece and stationary state data for displaying the piece in the stationary state. In the embodiment, a game of making the colors of pieces the same by turning over some pieces is executed as described above, so that each of the animation data and the stationary state data includes data for a front face piece and data for a rear face piece. The animation data includes, for example, data for displaying a process that a piece with its front face looking upward is turned over, data for displaying a process that a piece with its front face looking upward is turned over and is erased, data for displaying a process that a piece with its rear face looking upward is turned over, and data for displaying a process that a piece with its back surface facing upward is turned over and is erased and so forth. FIG. 8 shows an example of visualization of image data. An image of eight lines from top is an image of animation of the front face and the rear face, and an image of the lowest line is an image in the stationary state of the front face and the rear face. In addition, the piece usually has a square shape, and an I-shaped piece is a deformed piece.

Figure 9:
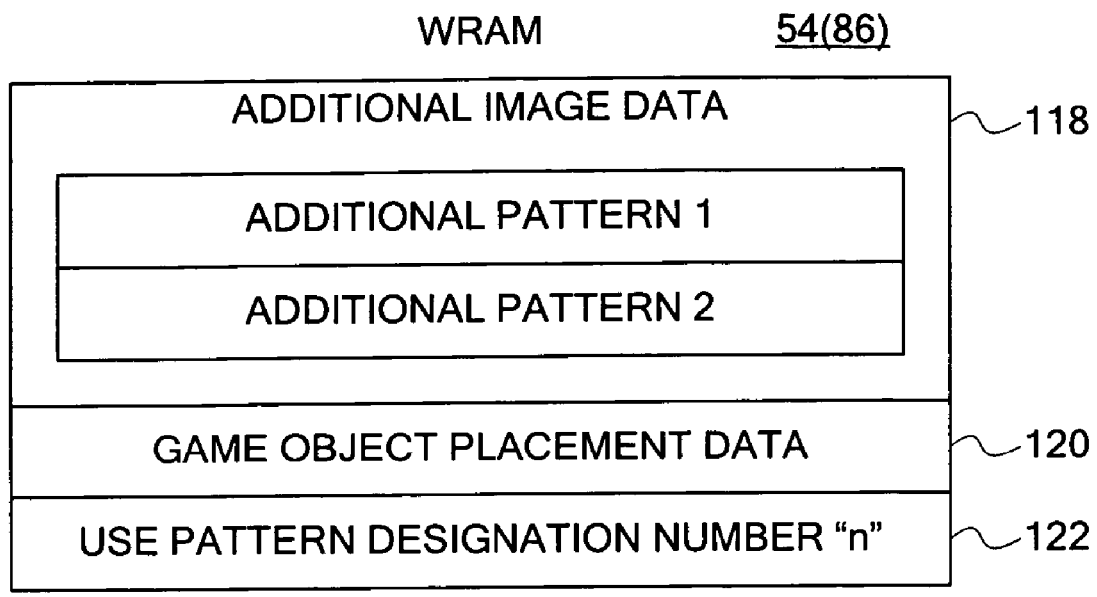
FIG. 9 is an illustrative view showing an example of a memory map of a WRAM in the embodiment of FIG. 1.

FIG. 9 shows an example of a memory map of the WRAM 54 when the first cartridge 14 to which the additional image data is written is inserted and the game is executed in the second game machine 12. Also in FIG. 9, only part of the memory map is shown for simplification, and other data necessary for the process is also stored in the WRAM 54.

Alternatively, the first cartridge 14 can be inserted in the first game machine 18. FIG. 9 may be of part of the memory map of the WRAM 86 in a case where the first cartridge 14 is inserted and the game is executed in the first game machine 18. It should be noted that in the embodiment, the case of executing the game of the first cartridge 14 by the second game machine 12 will be described. The case of executing the game of the first cartridge 14 by the first game machine 18 is similar to the above.

In a memory area 118, the additional image data read from the flash memory 14b in the first cartridge 14 is stored. The additional image data is read from the reserved area 112 in the flash memory 14b into the WRAM 54 at a time of initialization of the scene using the additional image data.

In a game object placement data memory area 120, data indicative of places in the game space of a plurality of game objects, generated by execution of the game object placement/movement program is stored. Each of the game objects is displayed in a designated state (for example, the state where the front face or the rear face looks upward) in a designated position based on the placement data.

In a use pattern designation number memory area 122, a variable "n" indicative of the number (identification information) of pattern data used as the image data of the piece is stored.

Figure 10:
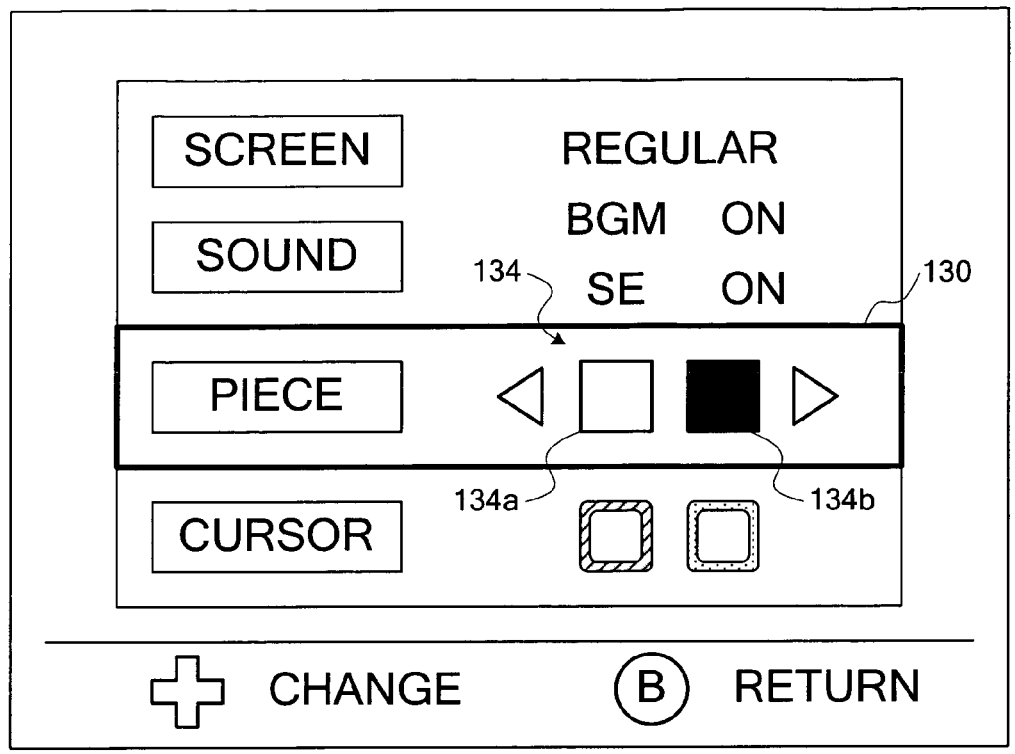
FIG. 10 is an illustrative view showing an example of a use option screen.
Figure 10:
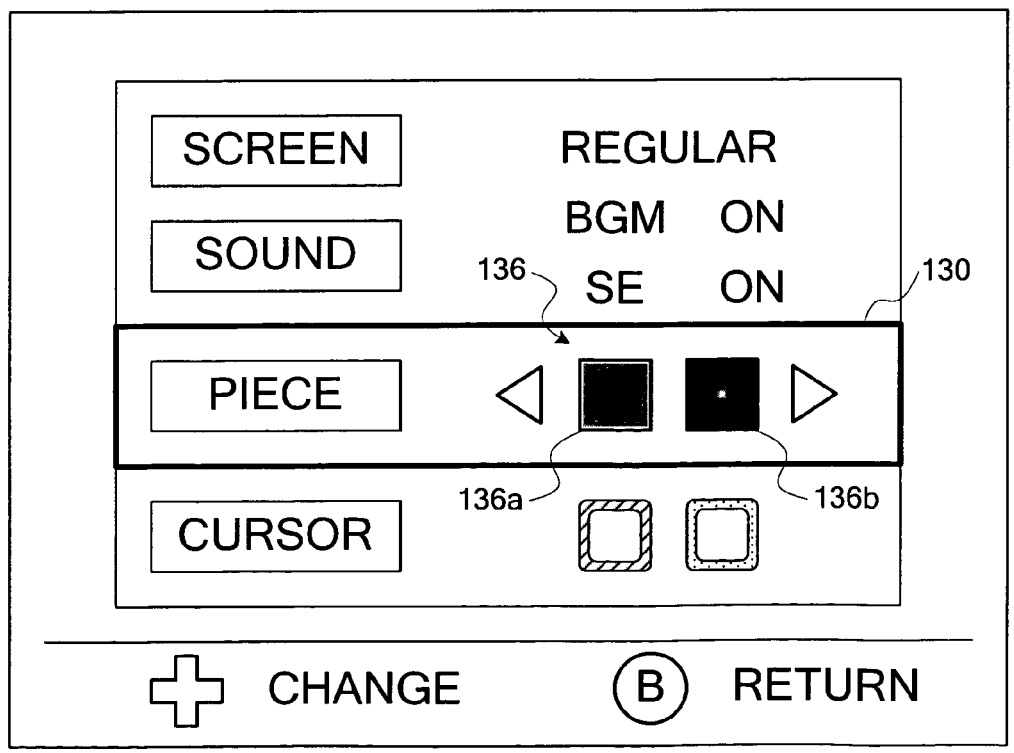

FIG. 10 shows an example of a use option screen displayed when the game of the first cartridge 14 is executed. The use option screen is displayed, for example, when an icon indicative of the use option is selected on a menu screen. On the use option screen, the player can instruct various settings and changes on the screen size, output of BGM and sound effect, a piece image, a cursor image, and the like. For example, a cursor 130 for selecting an item in accordance with an operation in the vertical direction of the cross switch 28a is moved. The item indicated by the cursor 130 is set according to an operation in the horizontal direction of the cross switch 28a. For example, by an operation on the B button 28e, the setting on the use option screen is finished.

Figure 11:
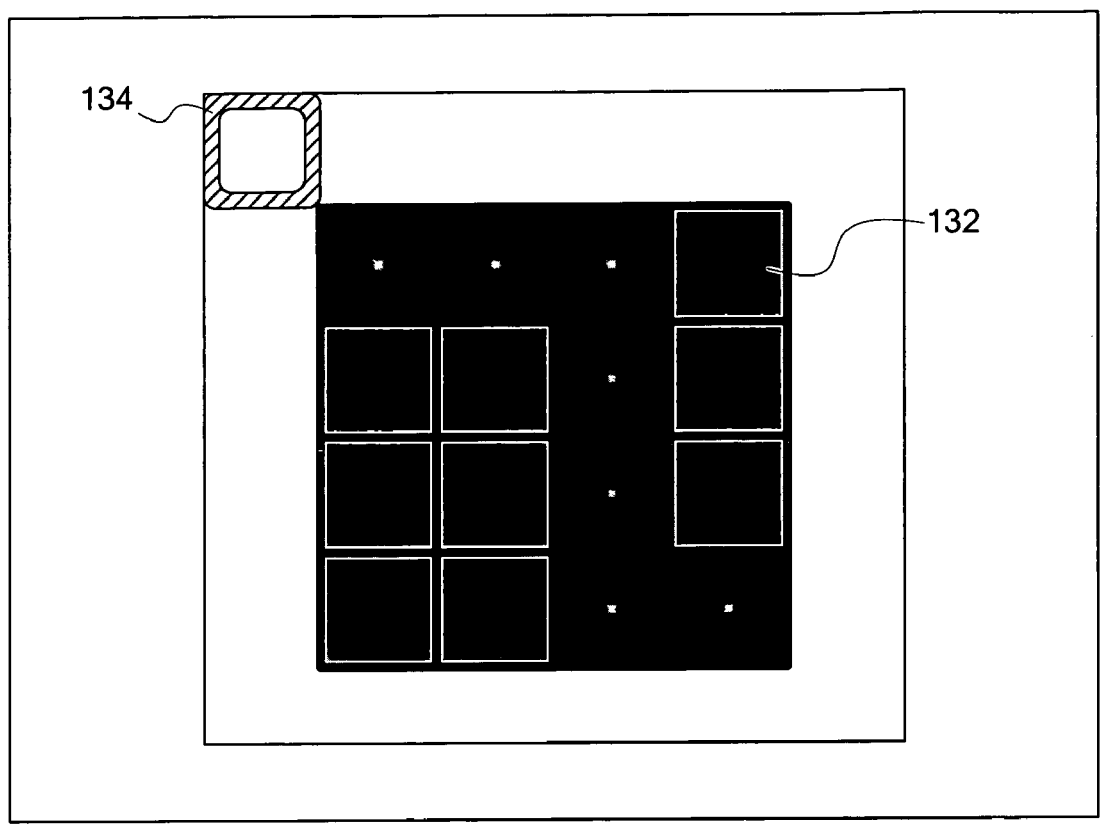
FIG. 11 is an illustrative view showing an example of a game screen in a first game process in a case where the additional pattern is used.

As shown in FIG. 10(A), in the screen in the initial state, an image 134 of an initial pattern stored in the image data memory area 110 in the ROM 14a is displayed in the item of the piece image. A pattern image 134a of the front face of the piece and a pattern image 134b of the rear face are displayed in a set. By an operation in the horizontal direction of the cross switch 28a, a pattern used as an image of the piece can be changed. When the right direction of the cross switch 28a is operated, as shown in FIG. 10(B), an image 136 of an additional pattern which is not stored as an initial pattern is displayed. An additional pattern image 136a of the front face and an additional pattern image 136b of the rear face are displayed in a set. The patterns are displayed in such a manner that a predetermined number of (for example, seven) initial images are displayed and, after that, a predetermined number of (for example, four) additional images are displayed. When the B button 28e is operated in a state where an image of the additional pattern is displayed, a game can be played using the additional pattern. More specifically, FIG. 11 shows an example of a game screen. For example, as images of a plurality of pieces 132 arranged in a matrix of 4×4, the images 136a and 136b of the additional patterns selected in FIG. 10(B) are used. In such a manner, the options for the player can be increased, and the player can play the game using his/her favorite images.

In addition, the game is played by selecting the pieces 132 to be turned over with one stroke to thereby make the colors of the pieces 132 in a row the same and erase the pieces. The cursor 134 for selecting the pieces 132 to be turned over is displayed. The player can select the start point by moving the cursor 134 onto a desired piece 132 by operating the cross switch 28a and pushing the A button 28d. After that, the player can select the end point by moving the cursor 134 on a plurality of pieces 132 to draw a desired path by operating the cross switch 28a, and pushing the A button 28d on the desired piece 132. The pieces 132 on the path from the selected start point to the selected end point are turned over. When the colors in each row are made the same and the pieces 132 in all of the rows are erased, the game is finished.

Figure 12:
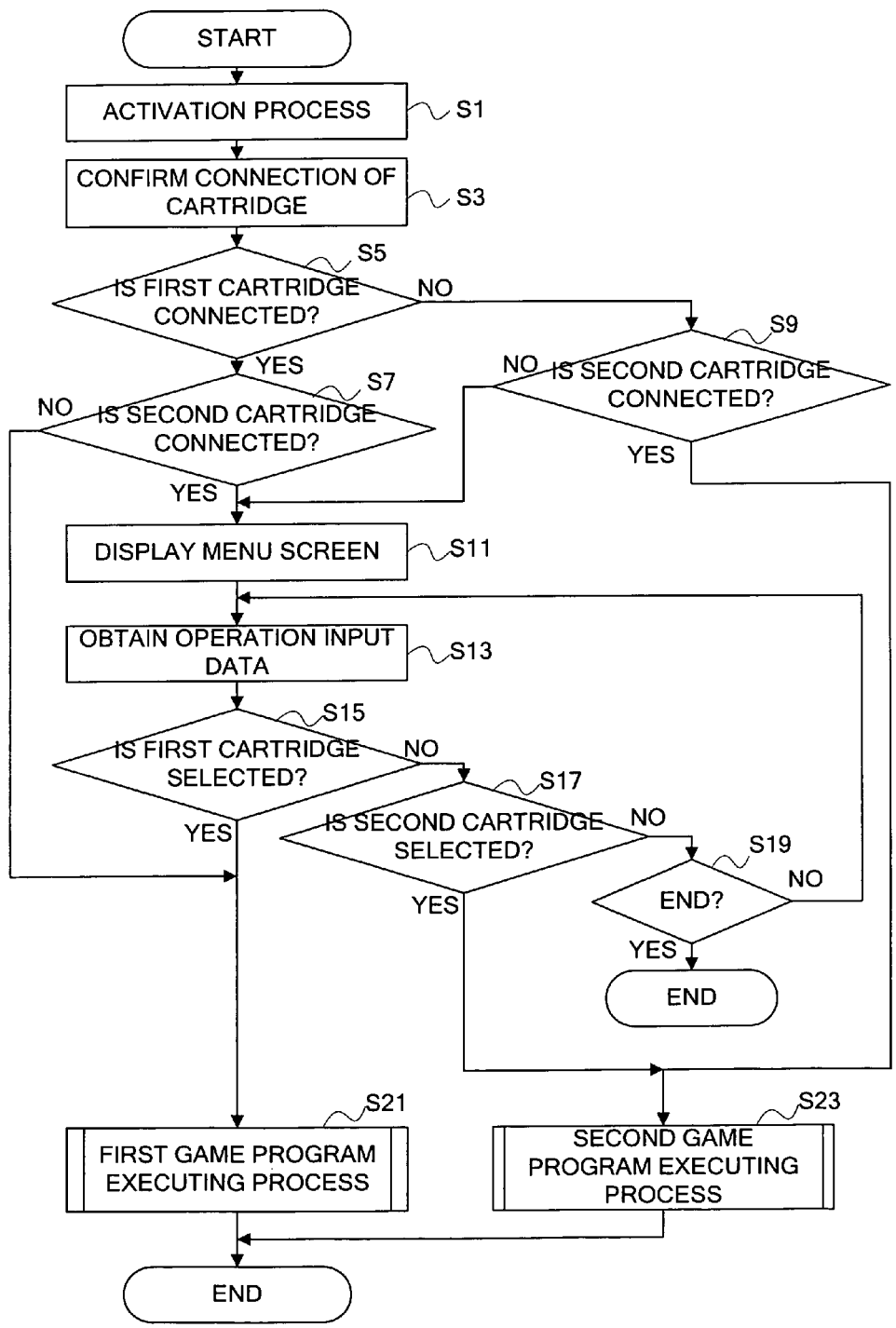
FIG. 12 is a flowchart showing an example of an operation of the game machine of the embodiment of FIG. 1.

FIG. 12 shows an example of an operation in the second game machine 12. When the power is turned on, the second CPU core 40 executes an activation process in a step S1. For example, the second CPU core 40 initializes the work memory in the WRAM 54, a register, and the like in accordance with the activation program in the built-in ROM. Then, in a step S3, the second CPU core 40 executes a process for confirming connection of a cartridge. For example, the second CPU core 40 may determine whether or not authentication codes of the first and second cartridges 14 and 16 can be read in accordance with a cartridge detecting program of the built-in ROM. Alternatively, the second CPU core 40 may detect whether or not the cartridges are connected based on signals from the first and second connectors 44 and 38. When connection of each of the cartridges is detected, each connection flag for the cartridge is turned on.

Subsequently, in a step S5, the second CPU core 40 determines whether the first cartridge 14 is connected or not. When "YES" in the step S5, that is, in a case where the connection flag for the first cartridge 14 is turned on, the second CPU core 40 determines whether the second cartridge 16 is connected or not in a step S7. When "YES" in the step S7, that is, in a case where the connection flag for the second cartridge 16 is also turned on, both of the cartridges 14 and 16 are inserted. In this case, to make the user select which one of the cartridges to be executed, the process advances to a step S11.

On the other hand, if "NO" in the step S7, that is, in a case where only the first cartridge 14 is inserted, the process advances to a step S21 to execute the first game program in the first cartridge 14.

Furthermore, if "NO" in the step S5, the second CPU core 40 determines whether the second cartridge is connected or not in a step S9. If "YES" in the step S9, that is, in a case where only the second cartridge is inserted, to execute the second game program of the second cartridge 16, the process advances to a step S23.

Additionally, in a case where only one cartridge is inserted in the embodiment, a game program stored in the cartridge is executed without displaying a menu screen. However, in another embodiment, the menu screen may be displayed.

On the other hand, if "NO" in the step S9, that is, when both of the cartridges 14 and 16 are not inserted, the process advances to the step S11 to notifies of that fact that both of the cartridges 14 and 16 are not connected on the menu screen.

In the step S11, the second CPU core 40 displays the menu screen (not shown) on the LCD 22 by using, for example, the GPU 58 and so forth. For example, display areas for the cartridges are provided on the menu screen. In a case where a cartridge is inserted, the title of the cartridge is displayed in the corresponding area. On the other hand, in a case where no cartridge is inserted, a message such as "no cartridge inserted" is displayed in the corresponding area. Additionally, image data for displaying the menu screen is obtained from the built-in ROM, and the data for displaying the title of a cartridge is obtained from the cartridge. By touching the area corresponding to a cartridge with the stick or the like 32 on the menu screen, the user can instruct execution of the cartridge. Alternatively, by operating the A button 28d in a state where the position of the cursor is moved to the area corresponding to the cartridge, execution of the cartridge can be instructed. Additionally, when a cartridge that is not inserted is selected, the operation is ignored. Also, for example, by operating the B button 28e, the end of the menu selection can be instructed.

Subsequently, in a step S13, the second CPU core 40 obtains operation input data from the touch panel 22 and the operation switch 28 via the I/F circuit 60. In steps S15, S17, and S19, the second CPU core 40 determines an instruction of the player based on the operation input data.

In the step S15, the second CPU core 40 determines whether the first cartridge is selected or not. For example, the second CPU core 40 determines whether or not the connection flag of the first cartridge 14 is turned on and input coordinates detected from input data are included in the area corresponding to the first cartridge 14. Alternatively, the second CPU core 40 may make determination based on the coordinates of the cursor when an operation on the A button 28d is detected.

Figure 15:
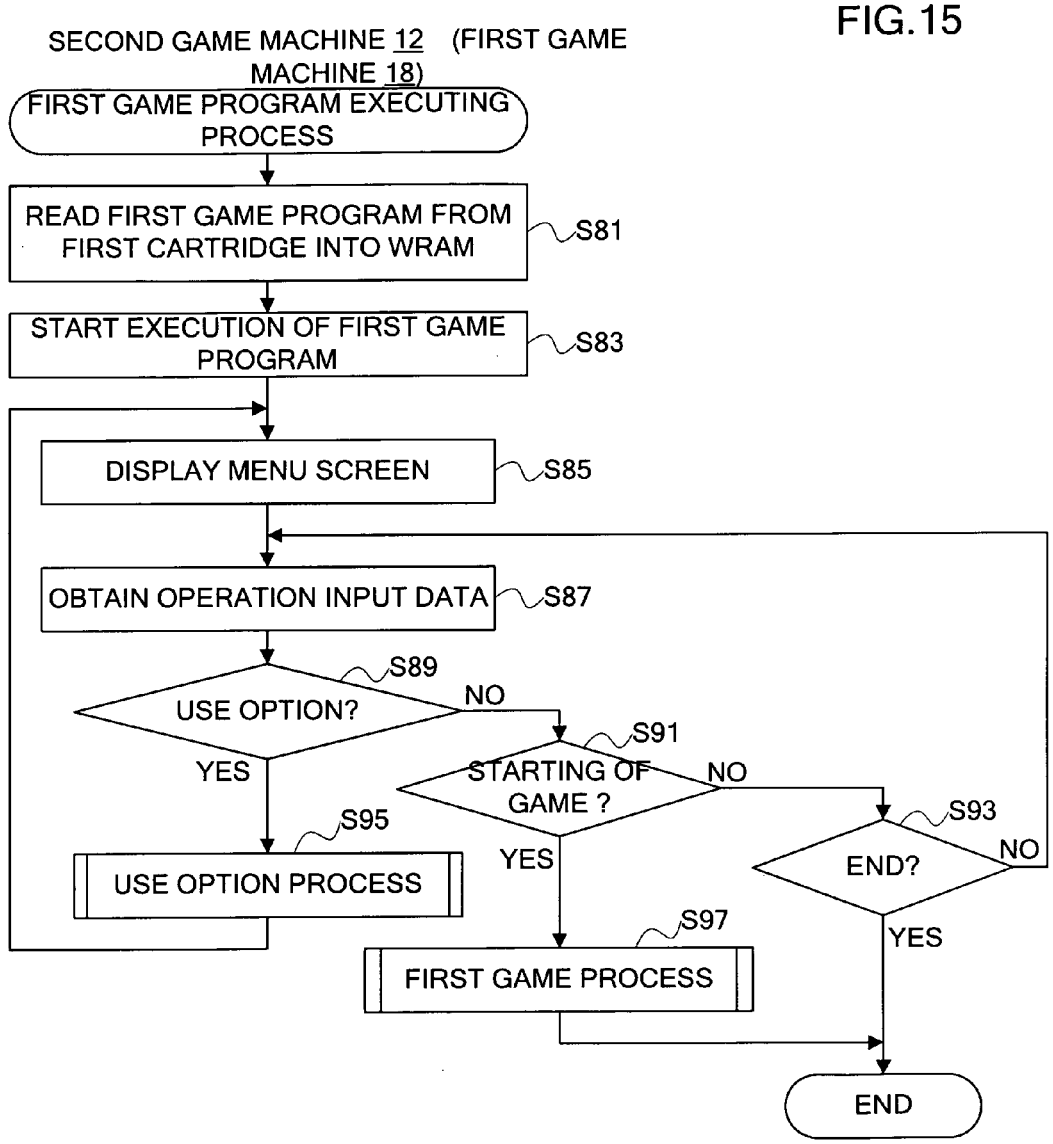
FIG. 15 is a flowchart showing an example of an operation of a first game program executing process in FIG. 12 (or an operation of the game machine of FIG. 3)

If "YES" in the step S15, the second CPU core 40 performs a first game program executing process in accordance with the start program in the built-in ROM in the step S21. By the process, the first game program of the first cartridge 14 is executed. FIG. 15 described later shows an example of an operation of the process in the step S21.

Figure 13:
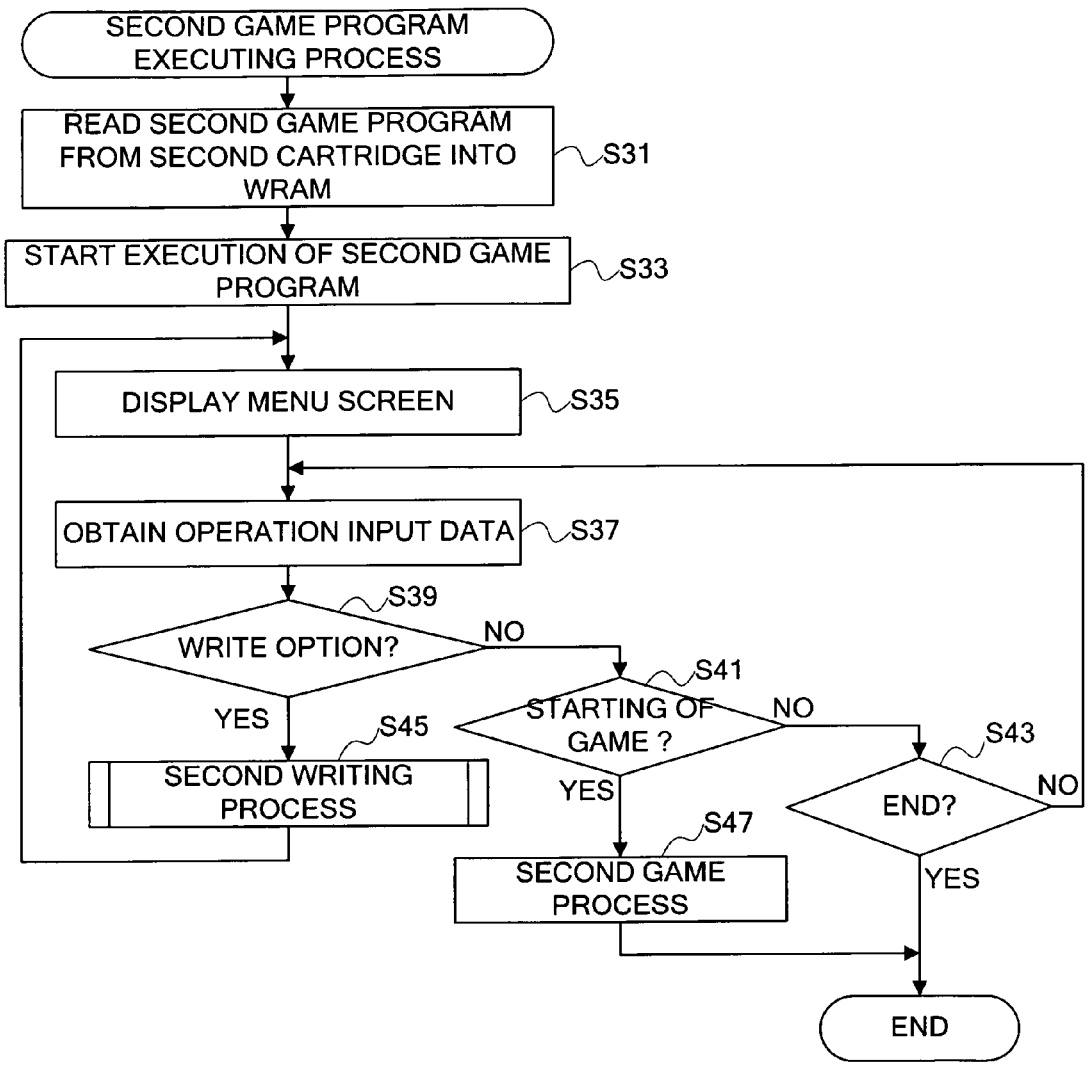
FIG. 13 is a flowchart showing an example of an operation of a second game program executing process in FIG. 12.

On the other hand, if "NO" in the step S15, the second CPU core 40 determines whether or not the second cartridge is selected similarly in the step S17. If "YES" in the step S17, the second CPU core 40 performs a second game program executing process in accordance with the start program in the built-in ROM in the step S23. By the process, the second game program of the second cartridge 16 is executed. FIG. 13 described later shows an example of an operation of the process in the step S23.

Furthermore, if "NO" in the step S17, the second CPU core 40 determines whether the end is instructed or not in the step S19. For example, the second CPU core 40 determines whether or not data indicative of an operation on the B button 28*e* is detected from the input data. If "NO" in the step S19, the process returns to the step S13. On the other hand, if "YES" in the step S19, the menu selection is finished and the power source is turned off.

In the embodiment, the writing program is stored in the second cartridge 16, and the additional data is written in the first cartridge 14 by execution of the writing program. Consequently, the second game program executing process in the step S23 will be described first.

FIG. 13 shows an example of the operation of the second game program executing process. In a first step S31 in FIG. 13, the second CPU core 40 reads the second game program from the second game program memory area 100 in the ROM 16*a* in the second cartridge 16 and expands it into the WRAM 54. In a step S33, the second CPU core 40 starts executing the read second game program. After that, the second CPU core 40 executes processes in accordance with the second game program.

It should be noted that as described above, in a case where a game program can be directly executed on the ROM as in the embodiment, the second CPU core 40 may jump to the start address of the program memory area in the ROM and start executing the program without loading the program into the work memory.

Then, the second CPU core 40 displays the menu screen (not shown), for example, on the LCD 22 in a step S35. On the menu screen, icons indicative of items such as writing of additional data, start of the game, end of the game, and the like are displayed. The player can select a desired item by moving the cursor onto the icon by operating the cross switch 28*a* and pushing the A button 28*d* or touching on the icon.

The second CPU core 40 obtains the operation input data in a step S37 and determines an instruction of the player based on the operation input data in the following steps S39, S41, and S43.

Figure 14:
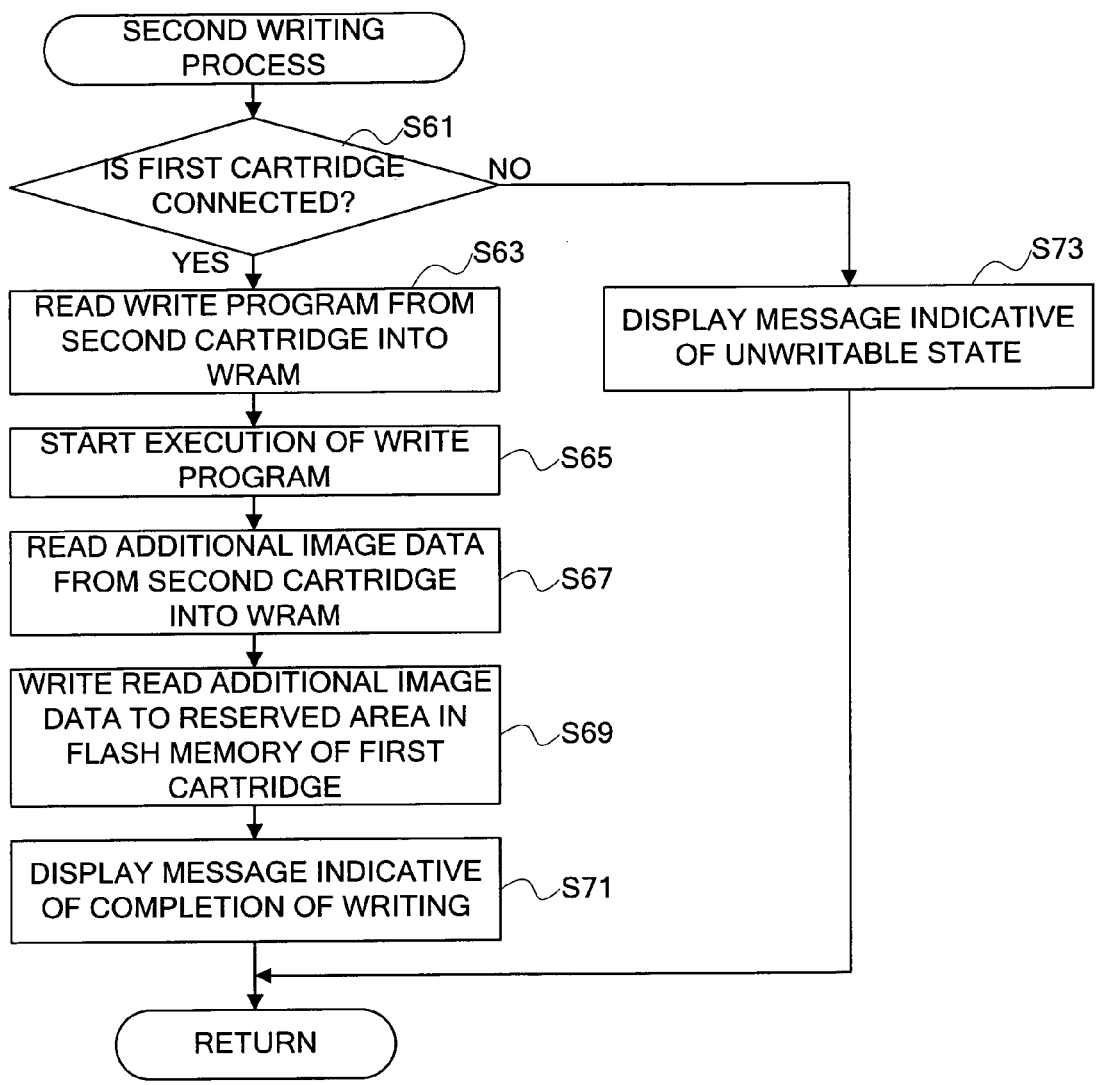
FIG. 14 is a flowchart showing an example of an operation of a second writing process in FIG. 13.

In the step S39, the second CPU core 40 determines whether a write option is selected or not. For example, the second CPU core 40 determines whether or not input coordinates are included in the display area of the icon of the write option, or determines whether or not the coordinates of the cursor at the time that an operation of the A button 28*d* is detected are included in the display area of the icon of the write option. If "YES" in the step S39, that is, in a case where writing of the additional data is instructed by the player, the second CPU core 40 executes a second writing process in a step S45. By the second writing process, in the embodiment, the additional data is written in the first cartridge 14 in accordance with the writing program of the second cartridge 16. FIG. 14 described later shows an example of an operation of the second writing process. After finishing the step S45, the process returns to the step S35.

On the other hand, if "NO" in the step S39, the second CPU core 40 determines whether starting of the game is instructed or not in the step S41. If "YES" in the step S41, that is, in a case where the icon indicative of start of the game is selected or the start button 28*b* is pushed, the second CPU core 40 executes the second game process in a step S47. By the operation, the game of the second cartridge 16 is played by the player. After finishing the step S47, the second CPU core 40 finishes the second game program executing process.

Furthermore, if "NO" in the step S41, the second CPU core 40 determines whether or not an icon indicative of end is selected in the step S43. If "NO" in the step S43, the process returns to the step S37. If "YES" in the step S43, the second game program executing process is finished.

It should be noted that the flowchart of FIG. 13 shows the operation in the case of instructing writing of additional data on the menu screen displayed at a time of execution start of the second game program. However, in another embodiment, additional data may be written in the second game process in the step S47. For example, when a predetermined condition is satisfied according to proceeding of the game, a screen prompting the player to confirm writing of the additional data is displayed, and the writing process is executed in accordance with a write instruction of the player. The predetermined condition is, for example, acquisition of a predetermined item, acquisition of a predetermined score, or completion of a predetermined stage or an event.

FIG. 14 shows an example of an operation of the second writing process in the step S45 in FIG. 13. In a first step S61 in FIG. 14, the second CPU core 40 determines whether or not the first cartridge 14 is connected based on the connection flag of the first cartridge 14. If "YES" in the step S61, that is, in a case where the first cartridge 14 is inserted in the second game machine 12 via the first connector 44, writing of the additional data is executed in the following steps S63 to S71.

In the step S63, the second CPU core 40 reads the writing program from the memory area 104 in the second cartridge 16 into the predetermined area 114 in the WRAM 54 to expand. Then, in a step S65, the second CPU core 40 starts executing the writing program and executes the processes in the following steps S67 to S71 in accordance with the writing program.

In the step S67, the second CPU core 40 reads the additional image data from the predetermined area 106 in the second cartridge 16 into the predetermined area 116 in the WRAM 54.

Subsequently, in a step S69, the second CPU core 40 writes the read additional image data to the reserved area 112 in the flash memory 14*b* of the first cartridge 14. It is noted that by rewriting the data of the block including the reserved area 112, the additional data is written. In the step S71, the second CPU core 40 displays a message indicative of completion of writing, for example, on the LCD 22. It is noted that data for displaying various messages is stored beforehand in the ROM 16*a* in the second cartridge 16.

On the other hand, if "NO" in the step S61, that is, in a case where writing is instructed when the first cartridge 14 is not inserted, the second CPU core 40 displays a message indicative of an unwritable state, for example, on the LCD 22 in a step S73. After completion of the step S71 or S73, the second writing process is finished, and the process returns to the step S35 in FIG. 13.

In the case of executing the first game program in the first cartridge 14 in which the additional data is written, the game of the first game program can be played using the additional data. FIG. 15 shows an example of an operation of the first game program executing process in the step S21 in FIG. 12. It should be noted that the case where the first CPU core 50 of the second game machine 12 executes the game of the first cartridge 14 in accordance with the flow of FIG. 15 will be described. Alternatively, the first game program may be executed by the second CPU core 40.

In addition, since the first cartridge 14 can be inserted in the first game machine 18, obviously, the game of the first cartridge 14 can be also executed by the first game machine 18. Also in the case of inserting the first cartridge 14 in which the additional data is written into the first game machine 18 and executing the first game program, the first CPU core 50 of the first game machine 18 performs the first game program executing process in accordance with a flowchart similar to that of FIG. 15. Therefore, a description of the case using the first game machine 18 is omitted.

In a first step S81 of FIG. 15, the first CPU core 50 reads the first game program from the predetermined area 108 in the first cartridge 14 into a predetermined area in the WRAM 54. In a step S83, the first CPU core 50 starts execution of the first game program. It should be noted that as described above, in a case where the game program can be directly executed on the ROM, the first CPU core 50 may jump to the start address of the program memory area in the ROM and start execution of the program without loading the program to the work memory.

Subsequently, in a step S85, the first CPU core 50 displays the menu screen (not shown), for example, on the LCD 20. On the menu screen, icons indicative of items such as a use option capable of setting use of the additional data, start of the game, end of the game, and the like are displayed. The player can instruct execution of a process corresponding to a desired item by moving the cursor onto the icon by operating the cross switch 28a and pushing the A button 28d.

The first CPU core 50 obtains the operation input data from the operation switch 28 via the I/F circuit 60 and stores it in the WRAM 54 in a step S87, and determines an instruction of the player based on the operation input data from the operation switch 28 in the following steps S89, S91, and S93.

Figure 16:
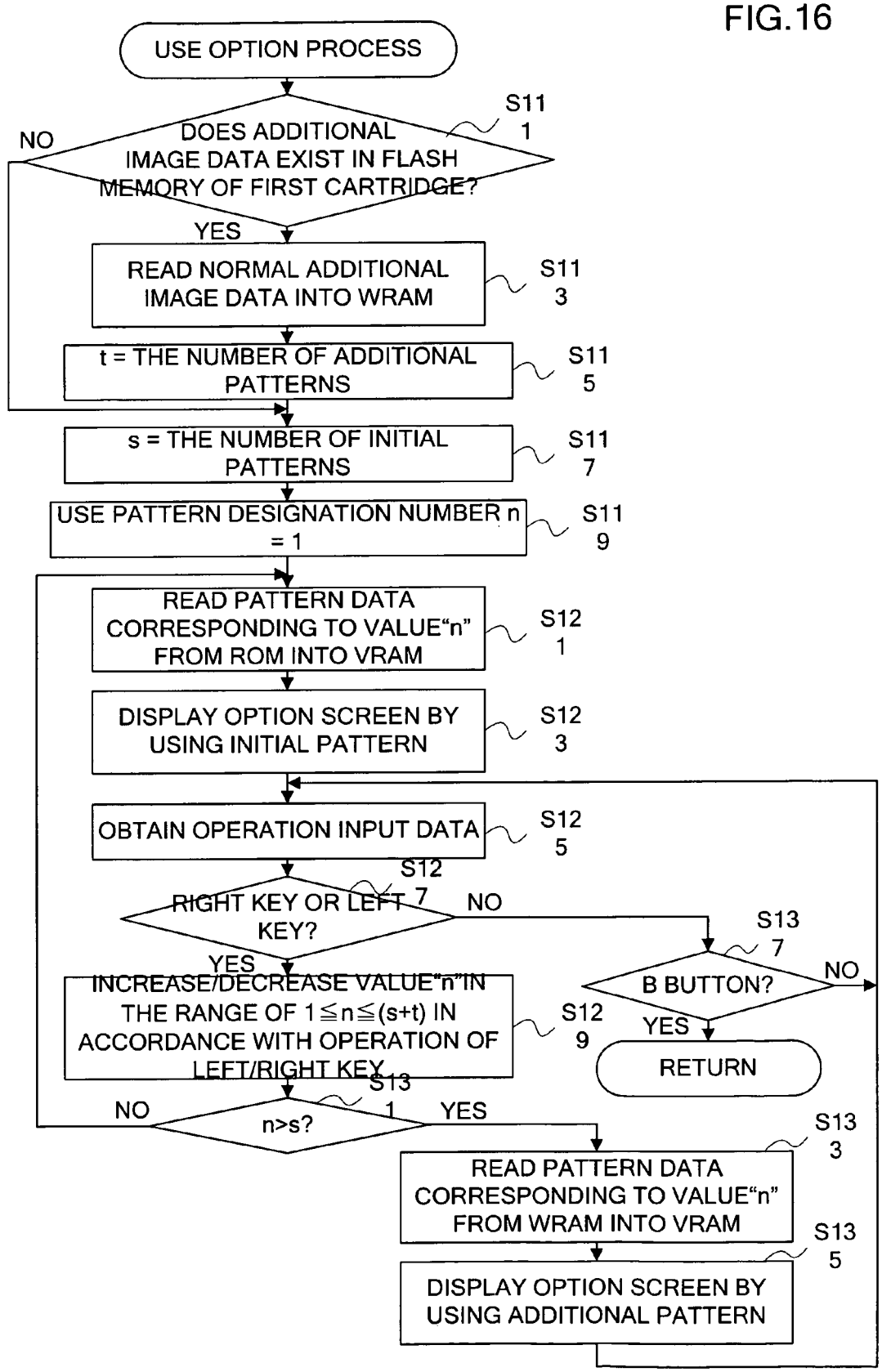
FIG. 16 is a flowchart showing an example of an operation of use option process in FIG. 15.

In the step S89, the first CPU core 50 determines whether an icon indicative of the use option is selected or not. For example, the first CPU core 50 determines whether or not the coordinates of a cursor on detection of an operation of the A button 28d are coordinates in a display range of the icon of the use option. If "YES" in the step S89, the first CPU core 50 executes a use option process in a step S95. In the use option process, an option setting screen as shown in FIG. 10 is displayed, and use of the additional data can be set. FIG. 16 described later specifically shows an example of an operation of the use option process. After completion of the step S95, the process returns to the step S85.

On the other hand, if "NO" in the step S89, the first CPU core 50 determines whether starting of the game is instructed or not in the step S91. If "YES" in the step S91, that is, in a case where the icon indicative of start of the game is selected or the start button 28b is pushed, the first CPU core 50 executes a first game process in a step S97. By the operation, the game of the first cartridge 14 is played by the player. In a case where use of the additional image data is set by the use option process in the step S95, the game is executed using the additional image data. An example of an operation of the first game process will be specifically described later with reference to FIG. 17. After finishing the step S97, the first CPU core 50 finishes the first game program executing process.

If "NO" in the step S91, the first CPU core 50 determines whether or not an icon indicative of end is selected in the step S93. If "NO" in the step S93, the process returns to the step S87. If "YES" in the step S93, the first game program executing process is finished.

FIG. 16 shows an example of an operation of the use option process in the step S95 in FIG. 15. In a first step S111 in FIG. 16, the first CPU core 50 accesses the flash memory 14b in the first cartridge 14 via the first connector 44 and determines whether the additional image data is stored in the reserved area 112 or not.

If "YES" in the step S111, the first CPU core 50 reads normal additional image data into the predetermined area 118 in the WRAM 54 in a step S113. In a step S115, the first CPU core 50 counts the number of read addition patterns and sets the value in a variable "t". In the embodiment, the area 112 in which four pieces of addition pattern data can be stored at the maximum is reserved in the flash memory 14b, so that the maximum value of "t" is 4.

On the other hand, if "NO" in the step S111, that is, when additional image data has not been written, or after the step S115, the first CPU core 50 sets a variable "s" as the number of initial patterns to be stored in the memory area 110 in the ROM 14a in a step S117. The number of initial patterns is, for example, 7.

Subsequently, in a step S119, the first CPU core 50 sets 1 as the initial value of the variable "n" indicative of use pattern designation number. That is, the first CPU core 50 writes 1 in the predetermined area 122 in the WRAM 54. In the game, pattern data having identification number corresponding to the value of the variable "n" is used as an image of the piece 132.

In a step S121, the first CPU core 50 reads initial pattern data corresponding to the value "n" from the memory area 110 in the ROM 14a into the VRAM 64 or 66. It should be noted that for example, a small piece is displayed on the use option screen, so that data for reduction display in the initial pattern is read. Since a piece in a stationary state is displayed on the use option screen, only data of the front face piece and data of the rear face piece in the stationary state may be read.

In the following step S123, the first CPU core 50 displays a use option screen as shown in FIG. 10(A) on the LCD 20 or 22 by using the initial pattern data. For example, the first CPU core 50 reads image data of the use option screen from the ROM 14a into the VRAM 64 or 66, generates image data for displaying a use option screen including the initial pattern 134 of the piece in the VRAM 64 or 66, and displays the screen on the LCD 20 or 22 by using the LCD controller 62.

As described above, the player can change and set the pattern of the piece 132 by operation of the operation switch 28 on the use option screen. In a step S125, the first CPU core 50 obtains the operation input data from the operation switch 28 via the I/F circuit 60, loads it to the WRAM 54, and makes an option setting in accordance with an instruction of the player. It should be noted that in FIG. 16, only processes related to a change in a piece image are shown and processes related to the other items are not shown.

In a step S127, the first CPU core 50 determines whether or not operation of the right or left key of the cross switch 28a is detected in a state where the position of the cursor 130 is adjusted to a position corresponding to a piece pattern change. If "YES" in the step S127, that is, in a case where a change in the pattern of the piece 132 is instructed by the player, the first CPU core 50 increases/decreases the value of the variable "n" within the range of $1 \leq n \leq (s+t)$ in accordance with the right or left key operation in a step S129. Specifically, when the left key operation is detected, if the value "n" is larger than 1, the value "n" of the memory area 122 is decremented only by 1. If the value "n" is equal to 1, the value "n" is not changed. On the other hand, when the right key operation is detected, if the value "n" is smaller than (s+t), the value "n" of the memory area 122 is incremented only by 1. If the value "n" is equal to (s+t), the value is not changed. In such a manner, if the value "n" is equal to or less than the value of "s", use of the initial pattern data is designated. If the value "n" is larger than the value of "s", use of the additional pattern data is designated.

In the following step S131, the first CPU core 50 determines whether or not the value of the variable "n" is larger than the value of "s" indicative of the initial pattern number. If "NO" in the step S131, that is, when the initial pattern is designated as the use pattern, the process returns to the step S121, and the first CPU core 50 loads the initial pattern data corresponding to the value "n" into the VRAM 64 or 66. Therefore, the initial pattern 134 changed according to a player's operation is displayed as the image of the piece 132 on the use option screen.

On the other hand, if "YES in the step S131, that is, in a case where the additional pattern is designated as the use pattern, the first CPU core 50 reads the additional pattern data corresponding to the value of the variable "n" from the predetermined area 118 in the WRAM 54 into the VRAM 64 or 66 in a step S133. For example, only data of the front face piece and the rear face piece in the stationary state may be read out of the data for reduction display in the corresponding addition pattern.

In the following step S135, the first CPU core 50 displays a use option screen on the LCD 20 or 22 by using the additional pattern data. Thus, the use option screen is displayed in which the additional pattern 136 is selected as the image of the piece as shown in FIG. 10(B). After finishing the step S135, the process returns to the step S125.

In addition, if "NO" in the step S127, the first CPU core 50 determines whether or not operation on the B button 28e is detected in a step S137. If "NO" in the step S137, the process returns to the step S125. On the other hand, if "YES" in the step S137, that is, in a case where end of the setting change on the use option screen is instructed by the player, the first CPU core 50 finishes the use option process, and the process returns to the step S85 in FIG. 15.

Figure 17:
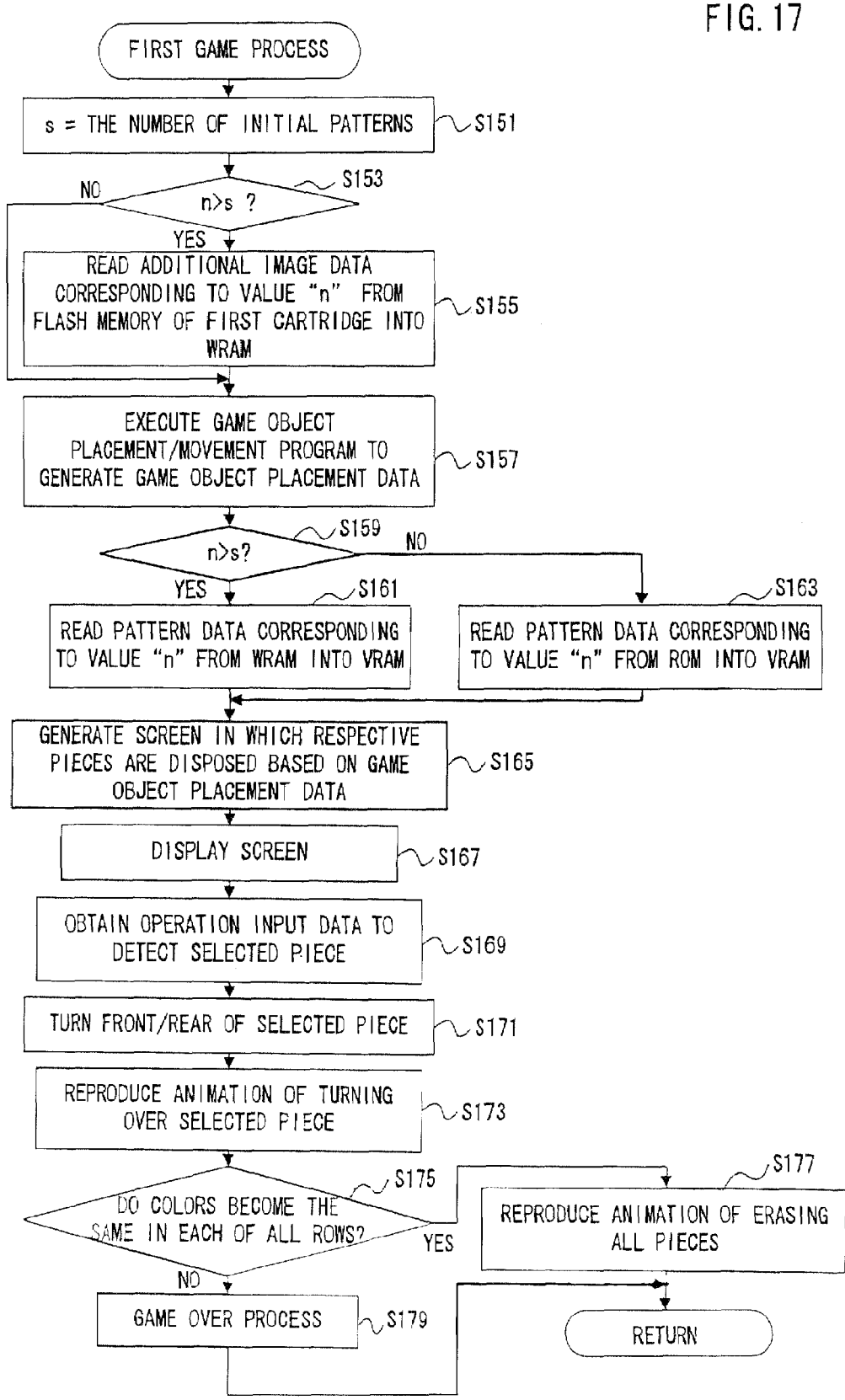
FIG. 17 is a flowchart showing an example of an operation of the first game process of FIG. 15.

FIG. 17 shows an example of an operation of the first game process in the step S97 in FIG. 15. When the first game process is started, in a step S151, the first CPU core 50 sets the number of initial patterns stored beforehand in the ROM 14a as the variable "s". Next, in a step S153, the first CPU core 50 determines whether or not the value of the variable "n" indicative of the use pattern designation number is larger than the value of "s".

If "YES in the step S153, that is, when use of the additional pattern is designated as an image of the piece 132, the first CPU core 50 reads the additional image data corresponding to the value "n" from the predetermined area 112 in the flash memory 14b in the first cartridge 14 into the predetermined area 118 in the WRAM 54 in a step S155.

On the other hand, if "NO" in the step S153, that is, in a case where use of the initial pattern is designated or when the step S155 is finished, the first CPU core 50 executes a game object placement/movement program in the ROM 14a, and generates game object placement data in the predetermined area 120 in the WRAM 54 in a step S157. By the operation, the game object placement data indicative of the position, the front/rear state, and the like of each of the plurality of pieces 132 as game objects is stored in the predetermined area 120. In addition, the size of the image of the piece 132, specifically, which one of the data for enlarge display and the data for reduction display is used may be set in accordance with the number of the pieces 132 disposed.

Subsequently, in a step S159, the first CPU core 50 determines whether or not the value of the variable "n" is larger than the value of the variable "s". If "YES" in the step S159, that is, in a case where an additional pattern is used, the first CPU core 50 reads the image data of an additional pattern corresponding to the value "n" from the predetermined area 118 in the WRAM 54 into the VRAM 64 or 66 in a step S161. In a case where use of a large piece image is set, the data for enlarge display is read. In a case where use of a small piece image is set, the data for reduction display is read.

On the other hand, if "NO" in the step S159, that is, in a case where an initial pattern is used, the first CPU core 50 reads the image data of an initial pattern corresponding to the value "n" from the predetermined area 110 in the ROM 14a into the VRAM 64 or 66 in a step S163. According to the size of the piece image, the data for enlarge display or the data for reduction display is read.

After finishing the step S161 or S163, the first CPU core 50 generates data for displaying a game screen in which the pieces 132 are disposed in the VRAM 64 or 66 based on the game object placement data, pattern data, and the like in a step S165. In a step S167, the first CPU core 50 displays the game screen on the LCD 20 or 22 by using the LCD controller 62. As a result, for example, as shown in FIG. 11, a game screen in which a plurality of pieces 132 is arranged in a predetermined shape is displayed. As described above, the game screen shows a game for a player. The player has to select and turn over the plurality of pieces 132 with one stroke and make the pieces in each of the rows have the same color.

In a step S169, the first CPU core 50 obtains the operation input data and detects the pieces 132 selected with one stroke. As described above, the start point is selected by operating the A button 28d, and a path is selected by operating the cross switch 28a, and the end point is selected by operating the A button 28d. In a step S171, the first CPU core 50 changes the front/rear state of each of the selected pieces, thereby updating the data indicative of the front/rear state of each of the pieces of the game object placement data. In a step S173, the first CPU core 50 reproduces animation of turning over the selected piece. Thus, in a case where use of the additional pattern is designated, animation data of the additional pattern is reproduced.

In a step S175, the first CPU core 50 determines whether or not the colors, that is, the front/rear states of the pieces become the same in all of the rows based on the game object placement data. If "YES" in the step S175, that is, when the game completion condition is satisfied, the first CPU core 50 reproduces animation of erasing all of the pieces in a step S177. Thus, when use of the additional pattern is designated, the animation data of the additional pattern is reproduced. On the other hand, if "NO" in the step S175, the first CPU core 50 executes a process for game over in a step S179 and displays a message of, for example, "game over". After finishing the step S177 or S179, the first game process is finished.

According to the embodiment, the writing program and the additional data is stored in the second cartridge 16. When both of the first and second cartridges 14 and 16 are inserted in the game machine 12, the additional data is written in the flash memory 14b in the first cartridge 14 in accordance with the writing program. Therefore, at a time of executing the game in accordance with the first game program in the first cartridge 14, the additional data written in the flash memory 14b can be used. In the embodiment, the additional data is image data of the game object. Consequently, by using the additional image data, a change not existing in the original first cartridge 14 can be given to a display mode of the piece 132 as a game object. Thus, since the data stored in the storage medium 16 is added to the other storage medium 14 and is allowed to be used by execution of the game program of the other storage medium 14, variety can be given to the game of the other storage medium 14.

Since data can be added by making the cartridges 14 and 16 for different two game systems interlocked or associated with each other, a synergistic effect can be created by the systems, and a synergistic effect in sales can be also expected.

Even if the first cartridge 14 has been already released, by storing the additional data and the writing program in the second cartridge 16 to be released later, data can be added to the first cartridge 14. By creating the first game program of the first cartridge 14 so that data in the reserved area in the flash memory 14b is usable, the first game program can be executed by using the added data. Therefore, the game of the earlier storage medium 14 can be varied by using data stored in the later storage medium 16. In addition, since it is unnecessary to specify the corresponding second cartridge 16 by the first cartridge 14 in advance, even after release of the first cartridge 14, the second cartridge 16 can be properly increased. For example, each time a new second cartridge 16 storing image data that can be used by the first game program in the first cartridge 14 is released, a game object in the game of the first cartridge 14 can be displayed in different display modes, so that the game can be further varied. On the contrary, also in a case where the second cartridge 16 in which additional data and the writing program is stored is released first and the first cartridge 14 is released later, similarly, variations can be given after release of the first cartridge 14. In such a manner, a game already released can be varied.

Furthermore, even when the first cartridge 14 is a storage medium for a lower-level model, additional data prepared in the second cartridge 16 as a storage medium for an upward compatible model can be written to the first cartridge 14 by a writing program. Therefore, by using data stored in the storage medium 16 for an upward compatible model, variations can be given to the game in the storage medium 14 for a lower-level model. In spite of the fact that the game machine 18 as a lower-level model cannot inherently use the second cartridge 16 of the game machine 12 as a higher-level model, variations can be given to a game executed in the game machine 18 as a lower-level model. Thus, the upward compatibility of the game machine 12 compatible with the game machine 18 as a lower-level model can be effectively used. Additionally, the lower-level model may be a downward compatible machine. In this case, for example, the first game program in the first cartridge 14 for a lower-level model released later is prepared so as to be able to use data of the earlier second cartridge 16 for a higher-level model. Alternatively, the second image data used in the second game program in the later second cartridge 16 for a higher-level model is prepared in consideration of use in the first game program of the earlier first cartridge 14. Consequently, the second image data used in the second game program of the second cartridge 16 for a higher-level model can be set as additional data.

It should be noted that in the foregoing embodiment, the writing program is executed in the step S45 in FIG. 14 during execution of the second game program in the step S23 in FIG. 12. However, in another embodiment, the writing program may not be executed in the game program but may be executed independently of the game program.

Furthermore, in each of the foregoing embodiments, the second game machine 12 is formed so that both of the first and second cartridges 14 and 16 can be inserted simultaneously. However, in another embodiment, the second game machine 12 may be formed so that one of the first and second cartridges 14 and 16 can be inserted separately. In this case, the second game machine 12 reads the writing program and the additional data from the second cartridge 16 inserted first and loads it to the WRAM 54, and the additional data is written into the reserved area 112 in the first cartridge 14 inserted later.

Figure 18:
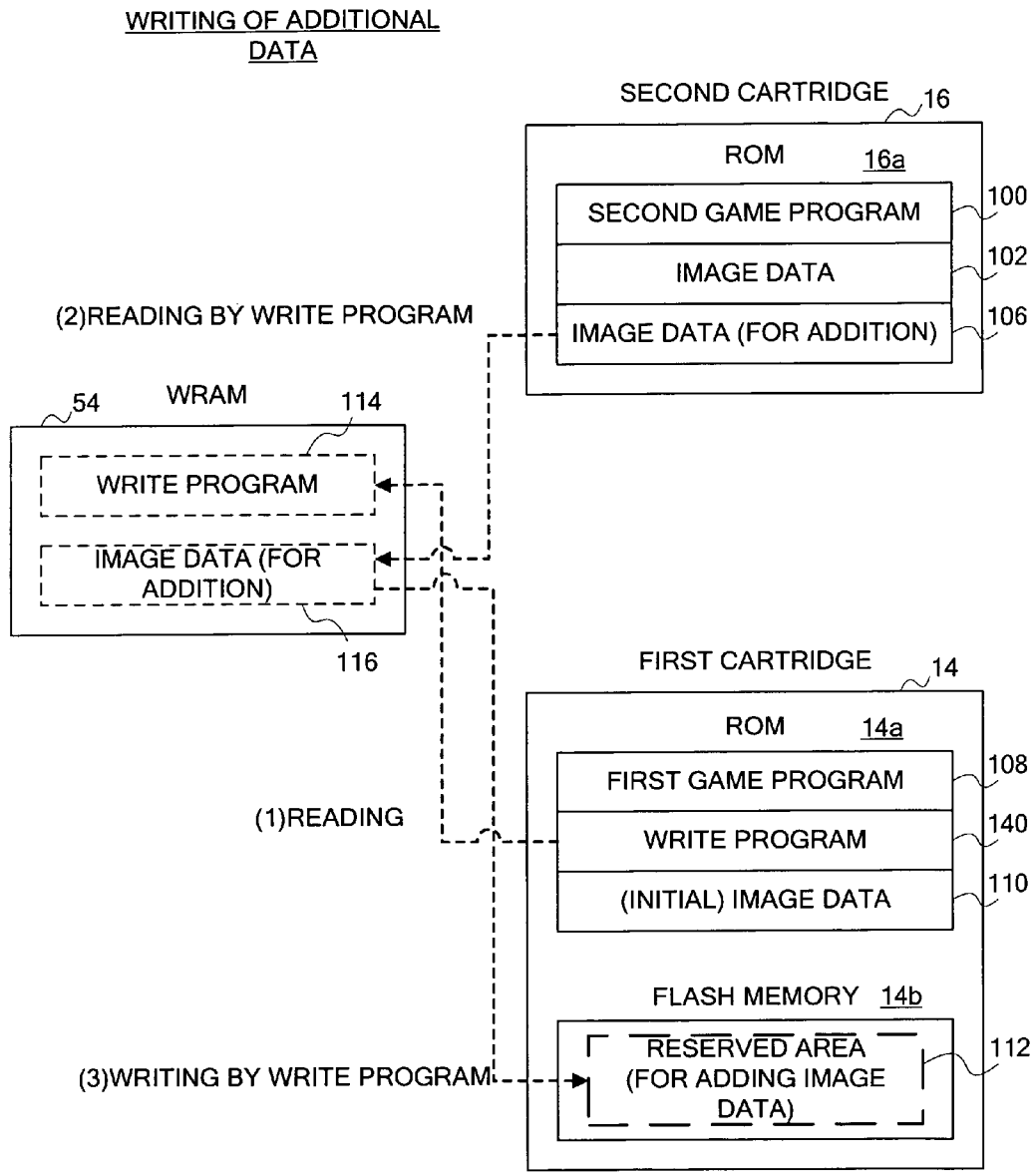
FIG. 18 is an illustrative view showing an example of a procedure of writing image data of the second cartridge to the first cartridge in a case where the writing program is stored beforehand in the first cartridge.

In addition, although the writing program is stored in the second cartridge 16 in each of the foregoing embodiments, as another embodiment, the writing program may be stored beforehand in the first cartridge 14 as shown in FIG. 18.

FIG. 18 shows an example of the procedure of writing additional data in the second cartridge 16 into the flash memory 14b in accordance with the writing program in the first cartridge 14. In the ROM 14a in the first cartridge 14, the first game program memory area 108 and the initial image data memory area 110 are provided and, further, a writing program memory area 140 is provided. In the flash memory 14b, the reserved area 112 for writing additional data is provided. The writing program is created so as to read the additional data from the predetermined area 106 in the ROM 16a in the second cartridge 16 and write the data into the reserved area 112 in the flash memory 14b in the first cartridge 14. The ROM 16a in the second cartridge 16 includes, in a manner similar to FIG. 5, the second game program memory area 100, the image data memory area 102, and the additional image data memory area 106. The additional data is stored in the predetermined area 106 that can be read by the writing program stored beforehand in the first cartridge 14.

It should be noted that the data adding process according to the writing program stored in the first cartridge 14 may be executed by the second CPU core 40 or the first CPU core 50. It is necessary to prepare the first CPU core 50 so as to be accessible to the second cartridge 16 or make the second CPU core 40 access to the second cartridge 16. In the following, an example of the case where the second CPU core 40 adds data will be described.

At a time of writing additional data to the first cartridge 14, first, the second CPU core 40 in the second game machine 12 reads the writing program stored in the predetermined area 140 in the ROM 14a into the predetermined area 114 in the WRAM 54. The reading operation may be performed when it is determined that a predetermined condition is satisfied in a manner similar to the case of FIG. 5. Next, the second CPU core 40 executes the read writing program, thereby reading the additional data stored in the predetermined area 106 in the ROM 16a in the second cartridge 16 into the predetermined area 116 in the WRAM 54. By execution of the writing program, the second CPU core 40 writes the additional data into the predetermined area 112 in the flash memory 14b in the first cartridge 14.

Figure 19:
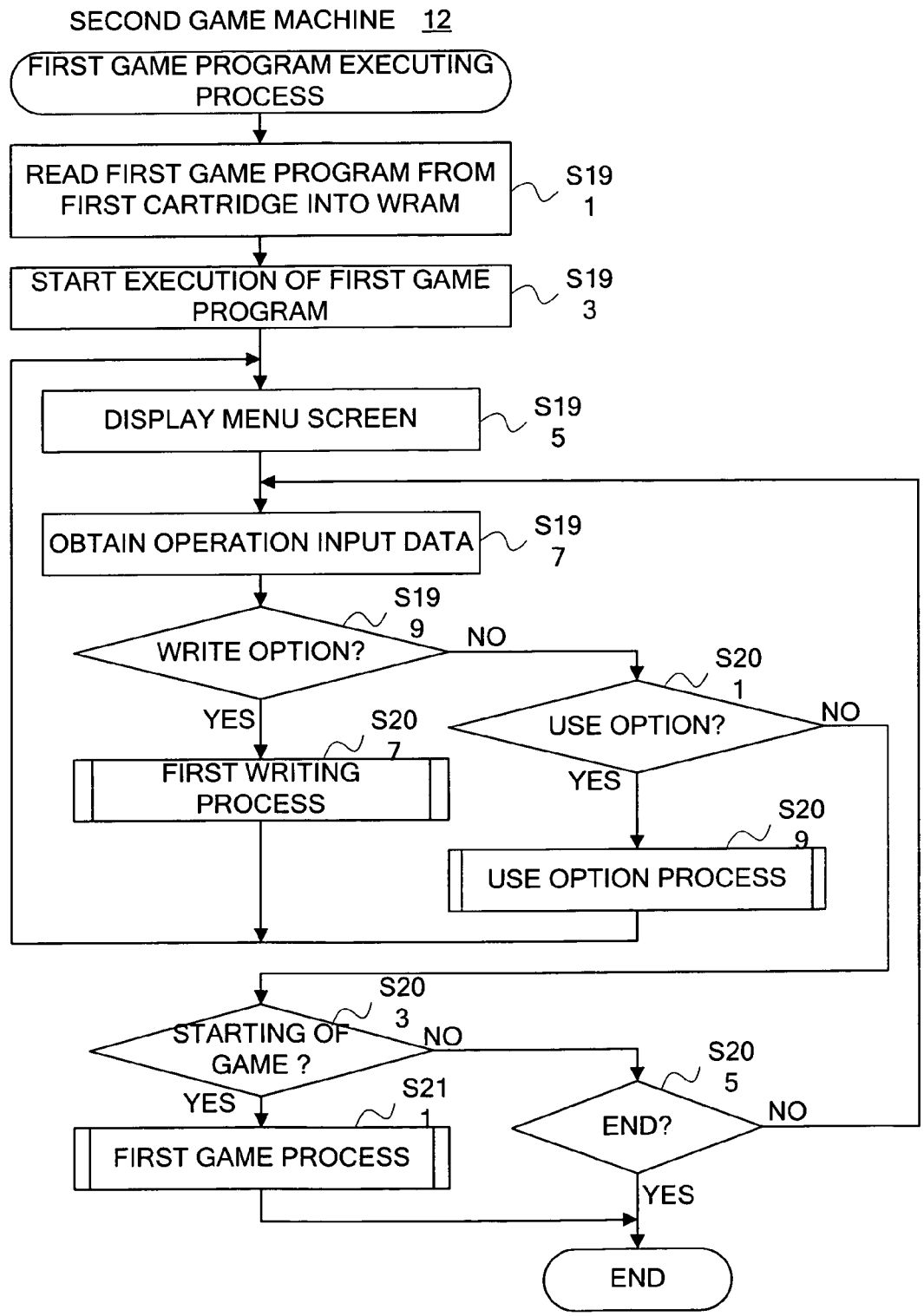
FIG. 19 is a flowchart showing an example of an operation of the first game program executing process in FIG. 12 in the embodiment of FIG. 18.

FIG. 19 shows a modification of the operation of the first game program executing process in the step S21 in FIG. 12. In this embodiment, the writing program is stored beforehand in the first cartridge 14, so that the writing program is executed during execution of the first game program in the first cartridge 14.

When the first game program executing process is started, in a first step S191 in FIG. 19, the second CPU core 40 reads the first game program from the first game program memory area 108 in the ROM 14a in the first cartridge 14 and expands it to the WRAM 54. In a step S193, the second CPU core 40 starts executing the read first game program. After that, the second CPU core 40 executes the process in accordance with the first game program.

It should be noted that as described above, in a case where a game program can be directly executed on the ROM as in the embodiment, the second CPU core 40 may jump to the start address of the program memory area in the ROM and start executing the program without loading the program to the work memory.

The second CPU core 40 displays a menu screen (not shown) on the LCD 20 or 22 in a step S195. On the menu screen, icons indicative of items such as writing of additional data, use option setting, starting of the game, end of the game, and the like are displayed. The player can select a desired item by moving the cursor onto the icon by operating the cross switch 28a and pushing the A button 28d.

The second CPU core 40 obtains the operation input data from the operation switch 28 in a step S197 and determines an instruction of the player based on the operation input data in the following steps S199, S201, S203, and S205.

Figure 20:
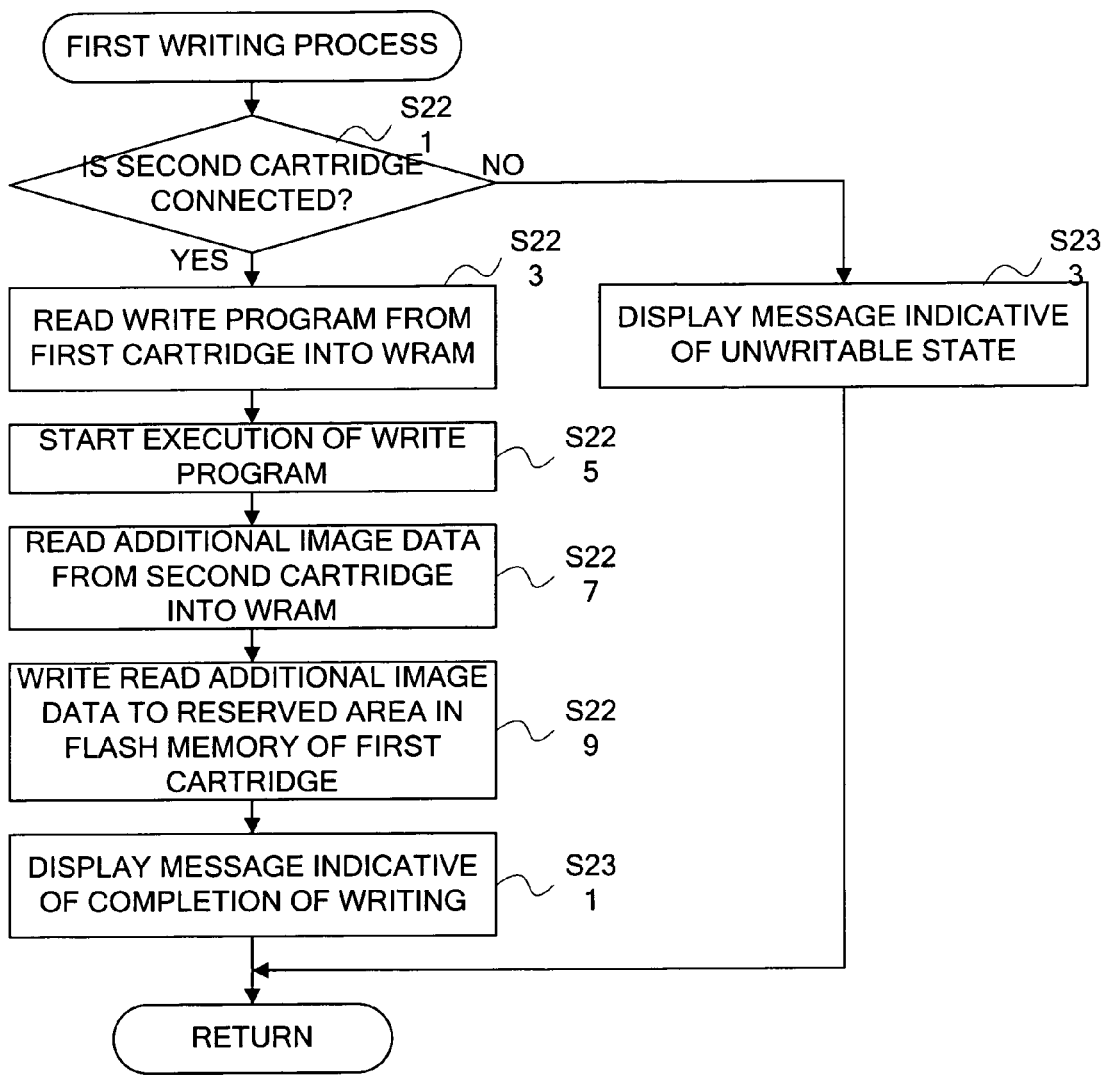
FIG. 20 is a flowchart showing an example of an operation of a first writing process in FIG. 19.

In the step S199, the second CPU core 40 determines whether a write option is selected or not. For example, the second CPU core 40 determines whether or not the coordinates of the cursor on detection of the operation of the A button 28*d* are included in the display area of the icon of the write option. If "YES" in the step S199, that is, in a case where writing of the additional data is instructed by the player, the second CPU core 40 executes a first writing process in a step S207. By the first writing process, in the embodiment, the additional data in the second cartridge 16 is written in the first cartridge 14 in accordance with the writing program of the first cartridge 14. FIG. 20 described later shows an example of a operation of the first writing process. After finishing the step S207, the process returns to the step S195.

On the other hand, if "NO" in the step S199, the second CPU core 40 determines whether the icon indicative of the use option is selected or not in the step S201. For example, the second CPU core 40 determines whether or not the coordinates of the cursor on detection of the operation of the A button 28*d* are the coordinates within the display range of the icon of the use option. If "YES" in the step S201, the second CPU core 40 executes the use option process in a step S209. The use option process is a process similar to the step S95 in FIG. 15, that is, the process in FIG. 16. By the process, use of the added data can be designated. After finishing the step S209, the process returns to the step S195.

On the other hand, if "NO" in the step S201, the second CPU core 40 determines whether or not starting of the game is instructed in the step S203. If "YES" in the step S203, that is, in a case where an icon indicative of starting of the game is selected or the start button 28*b* is pushed, the second CPU core 40 executes the first game process in a step S211. By the operation, the game of the first cartridge 14 is played by the player. In a case where use of the additional image data is set in the use option process in the step S209, the game is executed using the additional image data. The operation of the first game process is a process similar to the step S97 in FIG. 15, that is, the process of FIG. 17. After finishing the step S211, the first game program executing process is finished.

If "NO" in the step S203, the second CPU core 40 determines whether an icon indicative of end is selected or not in the step S205. If "NO" in the step S205, the process returns to the step S197. If "YES" in the step S205, the first game program executing process is finished.

It should be noted that FIG. 19 also shows the operation in the case of instructing writing of additional data on a menu screen displayed on start of execution of the first game program. However, in another embodiment, additional data may be written in the first game process in the step S211. For example, when a predetermined condition is satisfied according to proceeding of the game, a screen prompting the player to confirm writing of the additional data is displayed, and the writing process is executed in accordance with a write instruction of the player. The predetermined condition may be, similarly to the above, acquisition of a predetermined item, acquisition of a predetermined score, or completion of a predetermined stage or an event, for example.

FIG. 20 shows an example of an operation of the first writing process in the step S207 in FIG. 19. In a first step S211 in FIG. 20, the second CPU core 40 determines whether or not the second cartridge 16 is connected to the second connector 38 based on the connection flag of the second cartridge 16. If "YES" in the step S221, the second CPU core 40 executes writing of the additional data in the following steps S223 to S231.

In the step S223, the second CPU core 40 reads the writing program from the memory area 140 in the first cartridge 14 into the predetermined area 114 in the WRAM 54, and expands the writing program. In a step S225, the second CPU core 40 starts executing the writing program and executes the processes in the following steps S227 to S231 in accordance with the writing program.

In the step S227, the second CPU core 40 reads the additional image data from the predetermined area 106 in the second cartridge 16 into the predetermined area 116 in the WRAM 54.

Subsequently, in a step S229, the second CPU core 40 writes the read additional image data to the reserved area 112 in the flash memory 14*b* of the first cartridge 14. By rewriting the data of the block including the reserved area 112, the additional data is written. In the step S231, the second CPU core 40 displays a message indicative of completion of writing on the LCD 20 or 22. In addition, data for displaying various messages is stored beforehand in the ROM 14*a* in the first cartridge 14.

On the other hand, if "NO" in the step S221, that is, in a case where writing is instructed when the second cartridge 16 is not inserted, the second CPU core 40 displays a message indicative of an unwritable state on the LCD 20 or 22 in a step S233. After completion of the step S231 or S233, the first writing process is finished, and the process returns to the step S195 in FIG. 19.

In the embodiment, the writing program is stored beforehand in the first cartridge 14. By storing the additional data in the predetermined area 106 in the second cartridge 16 reserved by the writing program, the additional data in the second cartridge 16 can be written in the first cartridge 14 later. Therefore, in a manner similar to the case of the above-described embodiment (FIG. 5) in which the writing program and the additional data are stored in the second cartridge 16, the additional data stored in the other storage medium 16 can be added later to the storage medium 14. Thus, variety can be given to the game of the storage medium 14.

Even if the first cartridge 14 has been already released, by storing the additional data into the predetermined area 106 in the second cartridge 16 to be released later, data can be added later to the first cartridge 14. On the contrary, also in a case where the second cartridge 16 in which additional data is stored beforehand is released first and the first cartridge 14 is released later, similarly, data can be added to the first cartridge 14 after the release. Therefore, even after release, variety can be given to the game of the first cartridge 14.

It should be noted that in the foregoing embodiment, the writing program is executed in the step S207 in FIG. 19 during execution of the first game program in the step S21 in FIG. 12. However, in another embodiment, the writing program may not be executed in the game program but may be executed independently of the game program.

In addition, in the foregoing embodiment, the second game machine 12 is formed so that both of the first and second cartridges 14 and 16 can be inserted simultaneously. However, in another embodiment, the second game machine 12 may be formed so that one of the first and second cartridges 14 and 16 can be inserted separately. In this case, the second game machine 12 reads the writing program from the first cartridge 14 inserted first, and when the second cartridge 16 is inserted, the second game machine 12 reads additional data and, after that, when the first cartridge 14 is inserted, the second game machine 12 writes the additional data into the reserved area 112 Furthermore, in each of the foregoing embodiments, the case where pattern data of the piece 132 as a game object appearing in the game of the first cartridge 14 is stored as the additional data has been described. However, as another embodiment, the additional data may be image data of another object such as a character appearing in a game space or other image data of the background, cursor, icon, and the like.

Also, in each of the foregoing embodiments, by applying image data as the additional data, a new image can be selectively displayed in the game of the first cartridge 14. However, in another embodiment, as the additional data, data on the configuration, arrangement of an object or the like, or a character displayed or the like on a game image or screen, such as a stage, a map, or a new challenge, may be applied. In short, data used for generating a game image (game screen) by execution of the first game program may be applied as the additional data.

Alternatively, in another embodiment, by applying sound data as the additional data, sound such as new BGM or sound effect may be output in the execution of the first game program.

In addition, although the second game program for executing the game process is stored in the second cartridge 16 in each of the foregoing embodiments, as another embodiment, a game program may not be stored in the second cartridge 16. Namely, the second cartridge 16 may be a storage medium that stores only the additional data, a storage medium that stores the additional data and the writing program, a storage medium that stores the additional data and an application other than a game, a storage medium that stores the additional data, the writing program, and an application other than a game, or the like.

Furthermore, in each of the foregoing embodiments, the additional data stored in the second cartridge 16 for the second game machine 12 is written in the first cartridge 14 for the first game machine 18 by using the second game machine 12. However as another embodiment, it is also possible to form the first game machine 18 so that the first and second cartridges 14 and 16 can be inserted simultaneously or one by one, and write the additional data stored in the second cartridge 16 into the first cartridge 14 by using the first game machine 18.

Although the example embodiment presented herein has been described and illustrated in detail, it is clearly understood that the same is by way of illustration and example only and is not to be taken by way of limitation, the spirit and scope of the example embodiment being limited only by the terms of the appended claims.

What is claimed is:

1. A game system including a first storage medium, a second storage medium, and a first game machine in which both said first storage medium and said second storage medium can be simultaneously inserted, wherein said first storage medium comprises a writable and non-volatile first storing location, and a second storing location for storing beforehand first image data and a first game program for executing a game process by using at least one of said first image data and first additional image data stored in said first storing location, said first additional image data having the same format as that of said first image data but representing an image different from that of said first image data;

said second storage medium comprises a third storing location for storing beforehand second image data, a second game program for executing a game process by using said second image data, and second additional image data, and a writing program for writing said second additional image data into said first storing location in said first storage medium as said first additional image data, and said first game machine comprises:

first determining programmed logic circuitry for determining whether or not both of said first storage medium and said second storage medium are simultaneously inserted;

executing programmed logic circuitry for executing said writing program stored in said third storing location in said second storage medium when said first determining programmed logic circuitry determines that both of the media are inserted simultaneously; and adding programmed logic circuitry for reading said second additional image data from said third storing location in said second storage medium and writing the read data to said first storing location in said first storage medium by executing said writing program by said executing programmed logic circuitry, and operation data acquiring programmed logic circuitry for acquiring operation data from an operating controller being operated by a user, wherein said first game program executing said game process by using one image data selected by said operation data out of said first image data and said first additional image data.

2. A game system according to claim 1, wherein said first storage medium can be inserted to another game machine to which said second storage medium cannot be inserted.

3. A game system according to claim 2, wherein said first game machine is an upward compatible model of said another game machine.

* * * * *